(12) United States Patent
Yamamoto

(10) Patent No.: US 6,452,729 B2
(45) Date of Patent: Sep. 17, 2002

(54) TAKING LENS DEVICE

(75) Inventor: Yasushi Yamamoto, Kishiwada (JP)

(73) Assignee: Minolta Co., Ltd, Osaka (JP)

( * ) Notice: Subject to any disclaimer, the term of this patent is extended or adjusted under 35 U.S.C. 154(b) by 0 days.

(21) Appl. No.: 09/821,544

(22) Filed: Mar. 28, 2001

(30) Foreign Application Priority Data

Mar. 29, 2000 (JP) ........................................ 2000-095249
Dec. 4, 2000 (JP) ........................................ 2000-368344

(51) Int. Cl.⁷ ............................................... G02B 15/14
(52) U.S. Cl. ........................ 359/676; 359/691; 359/689; 359/686; 359/680
(58) Field of Search ................................ 359/680–682, 359/691, 689, 686, 676, 779, 781, 783; 396/72, 85, 275, 276

(56) References Cited

U.S. PATENT DOCUMENTS

| 5,909,318 | A | * | 6/1999 | Tanaka ........................ 359/687 |
| 5,969,878 | A | * | 10/1999 | Koizumi ....................... 359/681 |
| 5,999,329 | A | * | 12/1999 | Ohtake ........................ 359/686 |
| 6,016,229 | A | * | 1/2000 | Suzuki ........................ 359/740 |
| 6,101,044 | A | * | 8/2000 | Ori et al. ..................... 359/569 |
| 6,124,984 | A | * | 9/2000 | Shibayama et al. ......... 359/689 |
| 6,163,410 | A | * | 12/2000 | Nagaoka ..................... 359/654 |
| 6,229,655 | B1 | * | 5/2001 | Kohno et al. ............... 359/680 |
| 2001/0038496 | A1 | * | 11/2001 | Yamamoto et al. ......... 359/689 |

* cited by examiner

Primary Examiner—Evelyn A Lester
(74) Attorney, Agent, or Firm—Sidley Austin Brown & Wood LLP

(57) ABSTRACT

An optical device has zoom lens system comprised of plurality of lens units which achieves zooming by varying unit-to-unit distances and an image sensor that converts optical image formed by zoom lens system into an electrical signal. The zoom lens system is comprised of, from the object side, at least first lens unit having a negative optical power and second lens unit having a positive optical power. Following conditional formulae are fulfilled: $2<|f1/fw|<4$, and $0.058<(\tan \omega w)^2 \times fw/TLw<0.9$, where f1 represents focal length of first lens unit, fw represents focal length of entire optical system at wide-angle end, $\tan \omega w$ represents half view angle at wide-angle end, and TLw represents total length (the distance from first vertex to image plane) at wide-angle end.

24 Claims, 11 Drawing Sheets

FNO=2.58
W
— d
—·— g
---- SC
-0.1  0.1
SPHERICAL ABERRATION
SINE CONDITION

Y'=3.3
---- DM
— DS
-0.1  0.1
ASTIGMATISM

Y'=3.3
-5.0  5.0
DISTORTION %

FNO=2.79
M
— d
—·— g
---- SC
-0.1  0.1
SPHERICAL ABERRATION
SINE CONDITION

Y'=3.3
---- DM
— DS
-0.1  0.1
ASTIGMATISM

Y'=3.3
-5.0  5.0
DISTORTION %

FNO=2.87
T
— d
—·— g
---- SC
-0.1  0.1
SPHERICAL ABERRATION
SINE CONDITION

Y'=3.3
---- DM
— DS
-0.1  0.1
ASTIGMATISM

Y'=3.3
-5.0  5.0
DISTORTION %

FIG. 9A
FNO=2.67
W
— d
—·— g
----- SC
−0.1  0.1
SPHERICAL ABERRATION
SINE CONDITION
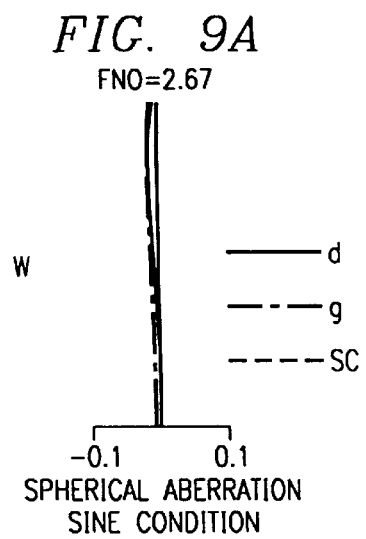
FIG. 9B
Y'=3.3
----- DM
— DS
−0.1  0.1
ASTIGMATISM
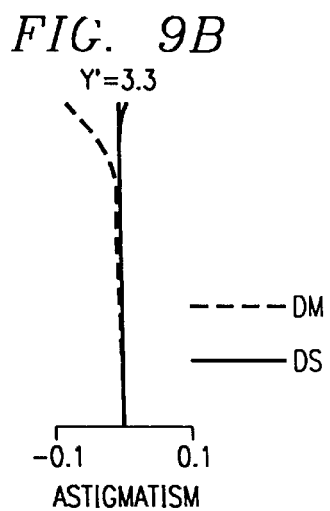
FIG. 9C
Y'=3.3
−5.0  5.0
DISTORTION %
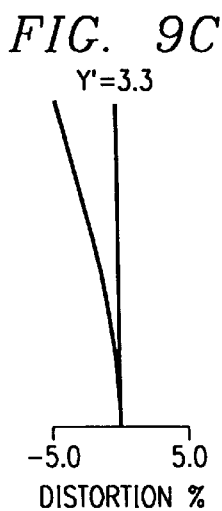
FIG. 9D
FNO=2.74
M
— d
—·— g
----- SC
−0.1  0.1
SPHERICAL ABERRATION
SINE CONDITION
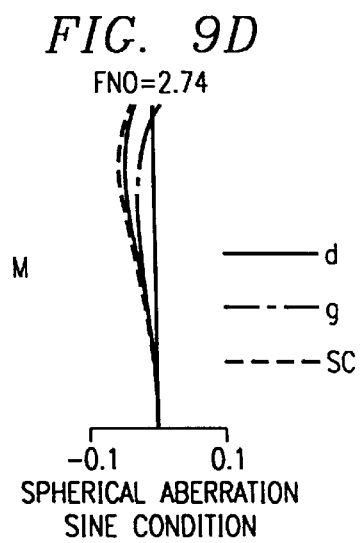
FIG. 9E
Y'=3.3
----- DM
— DS
−0.1  0.1
ASTIGMATISM
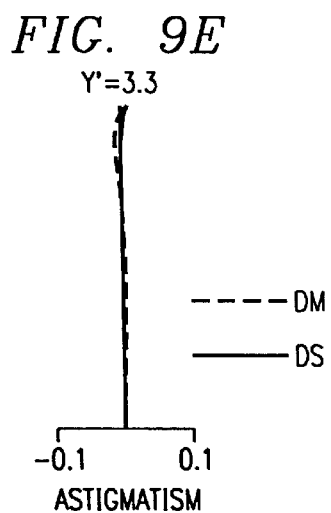
FIG. 9F
Y'=3.3
−5.0  5.0
DISTORTION %
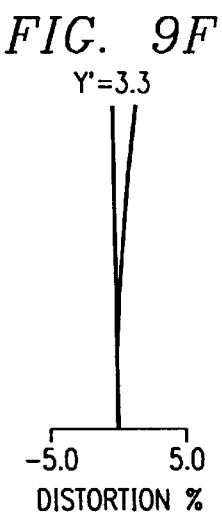
FIG. 9G
FNO=2.85
T
— d
—·— g
----- SC
−0.1  0.1
SPHERICAL ABERRATION
SINE CONDITION
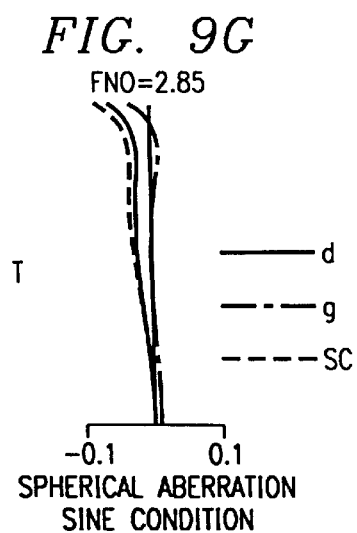
FIG. 9H
Y'=3.3
----- DM
— DS
−0.1  0.1
ASTIGMATISM
FIG. 9I
Y'=3.3
−5.0  5.0
DISTORTION %

FNO=2.86
W
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.89
M
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.99
T
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.79

W

—— d
—·— g
— — SC

-0.1  0.1
SPHERICAL ABERRATION
SINE CONDITION

Y'=3.3

---- DM
—— DS

-0.1  0.1
ASTIGMATISM

Y'=3.3

-5.0  5.0
DISTORTION %

FNO=2.93

M

—— d
—·— g
---- SC

-0.1  0.1
SPHERICAL ABERRATION
SINE CONDITION

Y'=3.3

---- DM
—— DS

-0.1  0.1
ASTIGMATISM

Y'=3.3

-5.0  5.0
DISTORTION %

FNO=3.08

T

—— d
—·— g
---- SC

-0.1  0.1
SPHERICAL ABERRATION
SINE CONDITION

Y'=3.3

---- DM
—— DS

-0.1  0.1
ASTIGMATISM

Y'=3.3

-5.0  5.0
DISTORTION %

FNO=2.89
W
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.86
M
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.88
T
— d
—·— g
---- SC
-0.1   0.1
SPHERICAL ABERRATION
SINE CONDITION

Y'=3.3
---- DM
—— DS
-0.1   0.1
ASTIGMATISM

Y'=3.3
-5.0   5.0
DISTORTION %

FNO=2.76
W
— d
—·— g
- - - - SC
-0.1   0.1
SPHERICAL ABERRATION
SINE CONDITION

Y'=3.3
- - - - DM
——— DS
-0.1   0.1
ASTIGMATISM

Y'=3.3
-5.0   5.0
DISTORTION %

FNO=2.90
M
— d
—·— g
- - - - SC
-0.1   0.1
SPHERICAL ABERRATION
SINE CONDITION

Y'=3.3
- - - - DM
——— DS
-0.1   0.1
ASTIGMATISM

Y'=3.3
-5.0   5.0
DISTORTION %

FNO=2.94
T
— d
—·— g
- - - - SC
-0.1   0.1
SPHERICAL ABERRATION
SINE CONDITION

Y'=3.3
- - - - DM
——— DS
-0.1   0.1
ASTIGMATISM

Y'=3.3
-5.0   5.0
DISTORTION %

TAKING LENS DEVICE

This application is based on Japanese Patent Application Nos. 2000-95249 and 2000-368344, filed on Mar. 29, 2000 and Dec. 4, 2000, respectively, the contents of which are hereby incorporated by reference.

BACKGROUND OF THE INVENTION

1. Field of the Invention

The present invention relates to an optical or taking lens device. More specifically, the present invention relates to a taking lens device that optically takes in an image of a subject through an optical system and then outputs the image as an electrical signal by means of an image sensor, for example a taking lens device that is used as a main component of a digital still camera, a digital video camera, or a camera that is incorporated in, or externally fitted to a device such as a digital video unit, a personal computer, a mobile computer, a portable telephone, or a personal digital assistant (PDA). The present invention relates particularly to a taking lens device which is provided with a compact, high-zoom-ratio zoom lens system.

2. Description of Prior Art

In recent years, as personal computers and other data processing devices have become more and more popular, digital still cameras, digital video cameras, and the like (hereinafter collectively referred to as digital cameras) have been coming into increasingly wide use. Personal users are using these digital cameras as handy devices that permit easy acquisition of image data to be fed to digital devices. As such image data input devices, digital cameras are expected to continue gaining popularity.

In general, the image quality of a digital camera depends on the number of pixels in the solid-state image sensor, such as a CCD (charge-coupled device), which is incorporated therein. Nowadays, many digital cameras, which are designed for general consumers, boast of high resolution of over a million pixels, and are thus approaching silver-halide film cameras in image quality. On the other hand, even in digital cameras designed for general consumers, zoom capability (especially optical zoom capability with minimal image degradation) is desired, and therefore, in recent years, there has been an increasing demand for zoom lenses for digital cameras that offer both a high zoom ratio and high image quality.

However, conventional zoom lenses for digital cameras that offer high image quality over a million pixels are usually built as relatively large lens systems. One way to avoid this inconvenience is to use, as zoom lenses for digital cameras, zoom lenses which were originally designed for lens-shutter cameras in which remarkable miniaturization and zoom ratio enhancement have been achieved in recent years. However, if a zoom lens designed for a lens-shutter camera is used unchanged in a digital camera, it is not possible to make good use of the light-condensing ability of the microlenses disposed on the front surface of the solid-state image sensor. This causes severe unevenness in brightness between a central portion and a peripheral portion of the captured image. The reason is that in a lens-shutter camera, the exit pupil of the taking lens system is located near the image plane, and therefore, off-axial rays exiting from the taking lens system strike the image plane from oblique directions. This can be avoided by locating the exit pupil away from the image plane, but not without making the taking lens system larger.

SUMMARY OF THE INVENTION

An object of the present invention is to provide a taking lens device or optical device which is provided with a novel zoom lens system that, despite being compact, offers both a high zoom ratio and high image quality.

To achieve this object, according to one aspect of the present invention, an optical or taking lens device is provided with: a zoom lens system that is comprised of a plurality of lens units which achieves zooming by varying the unit-to-unit distances and an image sensor that converts an optical image formed by the zoom lens system into an electrical signal. The zoom lens system is comprised of at least, from the object side thereof to an image side thereof, a first lens unit having a negative optical power and a second lens unit having a positive optical power, and the following conditional formulae are fulfilled:

$$2 < |f1/fw| < 4$$

$$0.058 < (\tan \omega w)^2 \times fw/TLw < 0.9$$

where f1 represents the focal length of the first lens unit;

fw represents the focal length of the entire optical system at the wide-angle end;

tan ωw represents the half view angle at the wide-angle end; and

TLw represents the total length (the distance from the first vertex to the image plane) at the wide-angle end.

According to another aspect of the present invention, an optical or taking lens device is provided with: a zoom lens system that is comprised of a plurality of lens units which achieves zooming by varying the unit-to-unit distances and an image sensor that converts an optical image formed by the zoom lens system into an electrical signal. The zoom lens system is comprised of at least, from the object side thereof to an image side thereof, a first lens unit having a negative optical power, a second lens unit having a positive optical power, and the following conditional formulae are fulfilled:

$$2 < |f1/fw| < 4$$

$$10 < TLw \times Fnt/(fw \times \tan \omega w) < 40$$

where f1 represents the focal length of the first lens unit;

fw represents the focal length of the entire optical system at the wide-angle end;

TLw represents the total length (the distance from the first vertex to the image plane) at the wide-angle end;

Fnt represents the f-number at the telephoto end; and tan ωw represents the half view angle at the wide-angle end.

BRIEF DESCRIPTION OF THE DRAWINGS

This and other objects and features of the present invention will become clear from the following description, taken in conjunction with the preferred embodiments with reference to the accompanying drawings in which:

FIGS. 9A to 9I are aberration diagrams of Example 2;

DESCRIPTION OF THE PREFERRED EMBODIMENTS

Figure 1:
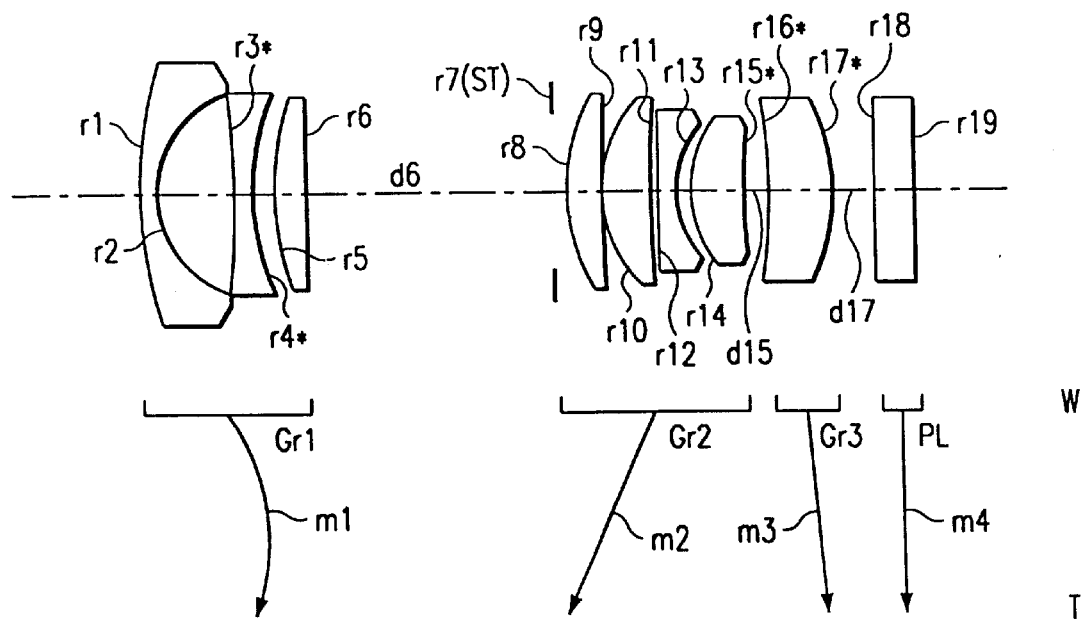
FIG. 1 is a lens arrangement diagram of a first embodiment (Example 1) of the invention.
Figure 2:
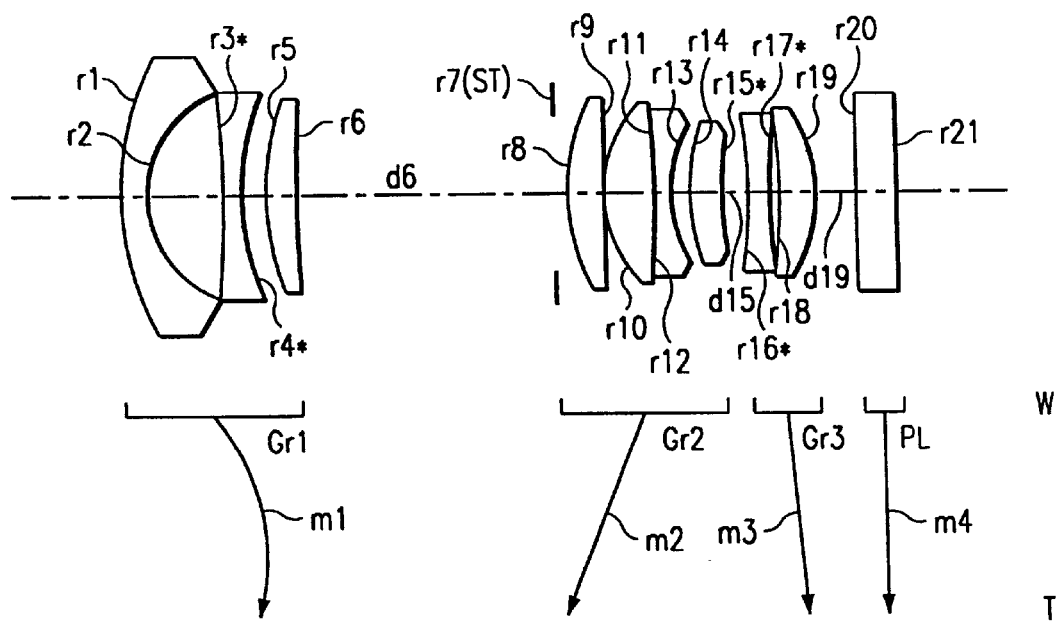
FIG. 2 is a lens arrangement diagram of a second embodiment (Example 2) of the invention.
Figure 3:
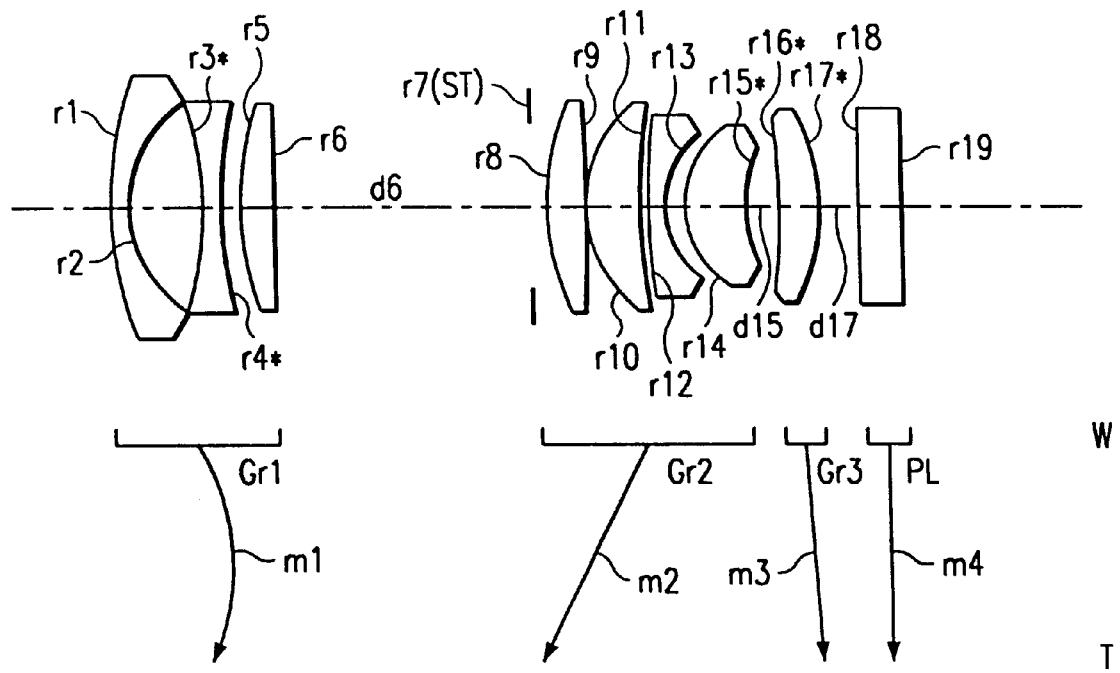
FIG. 3 is a lens arrangement diagram of a third embodiment (Example 3) of the invention.
Figure 4:
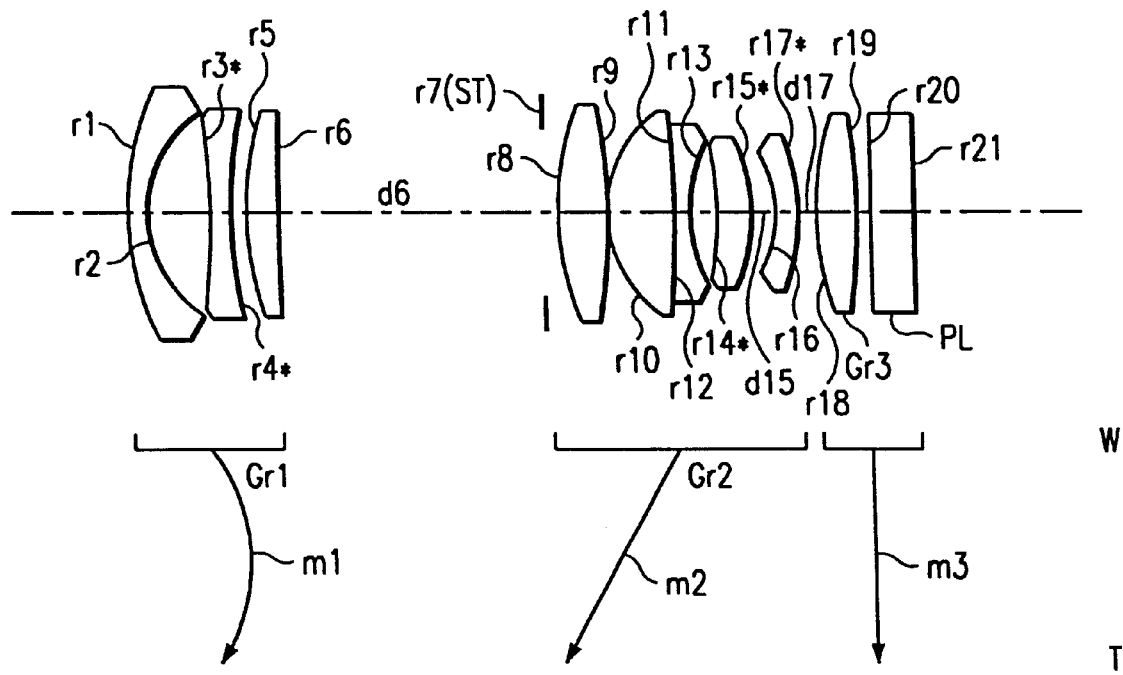
FIG. 4 is a lens arrangement diagram of a fourth embodiment (Example 4) of the invention.
Figure 5:
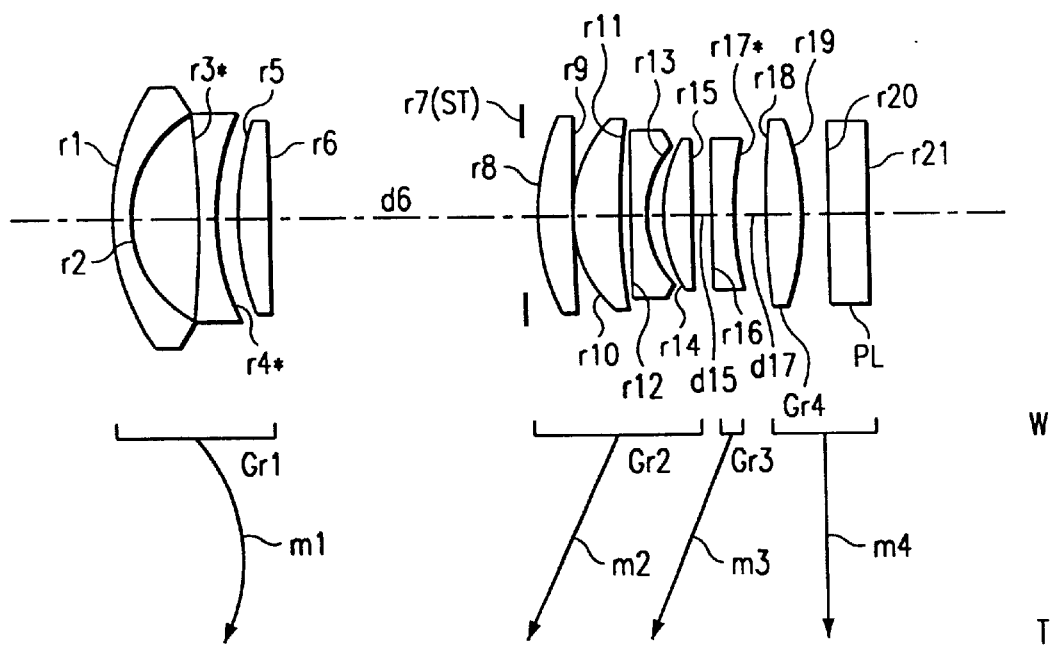
FIG. 5 is a lens arrangement diagram of a fifth embodiment (Example 5) of the invention.
Figure 6:
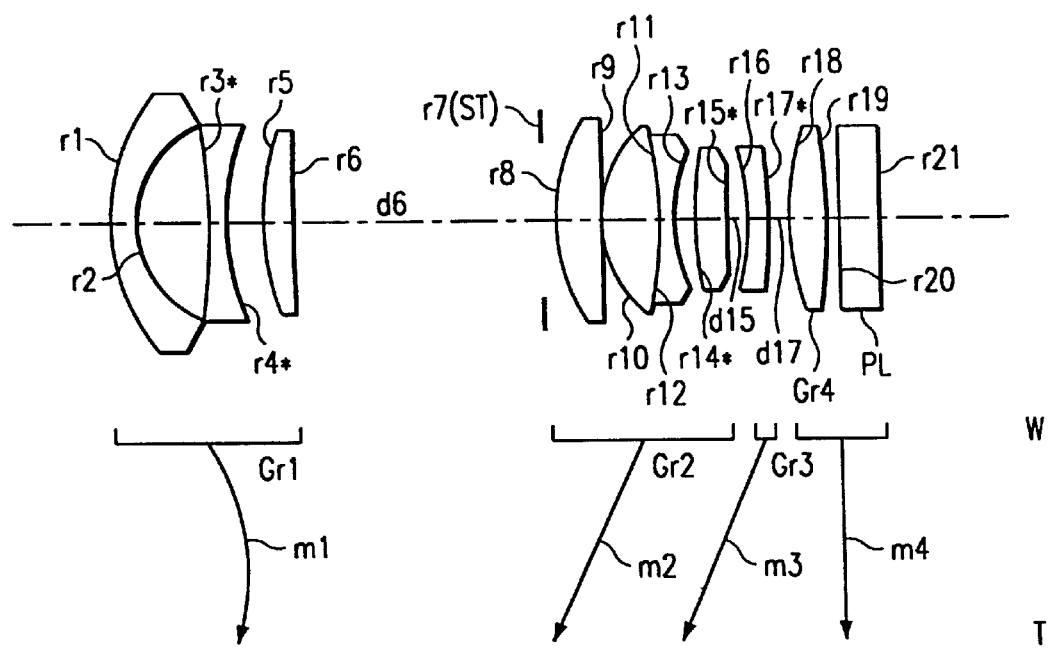
FIG. 6 is a lens arrangement diagram of a sixth embodiment (Example 6) of the invention.
Figure 7:
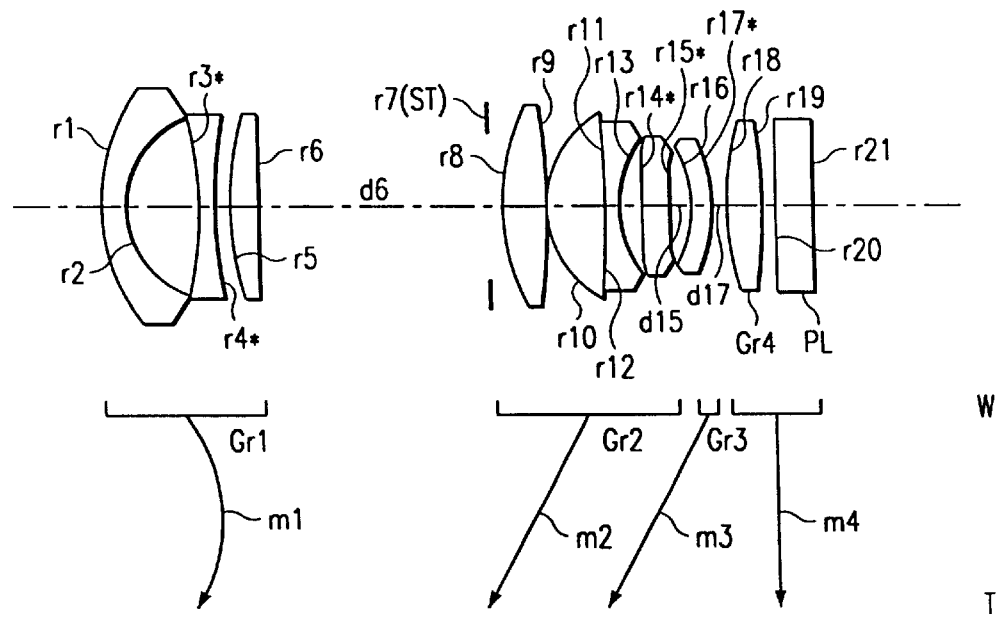
FIG. 7 is a lens arrangement diagram of a seventh embodiment (Example 7) of the invention.
Figure 15:
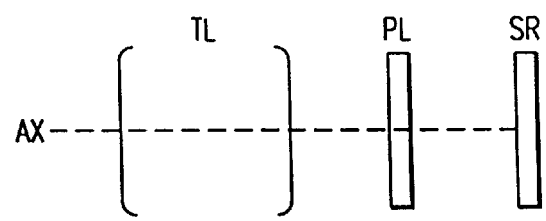
FIG. 15 is a diagram schematically illustrating the outline of the optical construction of a taking lens device embodying the invention.
Figure 16:
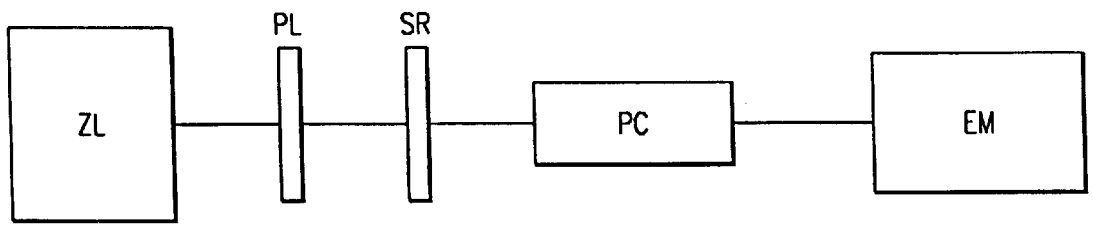
FIG. 16 is a diagram schematically illustrating the outline of a construction of an embodiment of the invention that could be used in a digital camera.
Figure 8A:
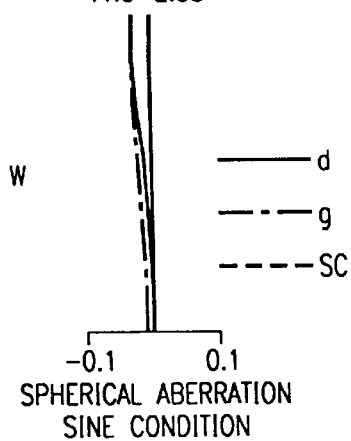
FIGS. 8A to 8I are aberration diagrams of Example 1
Figure 8B:
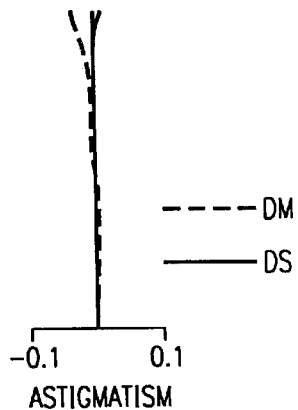
Figure 8C:
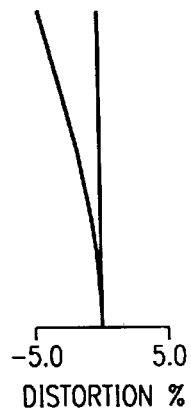
Figure 8D:
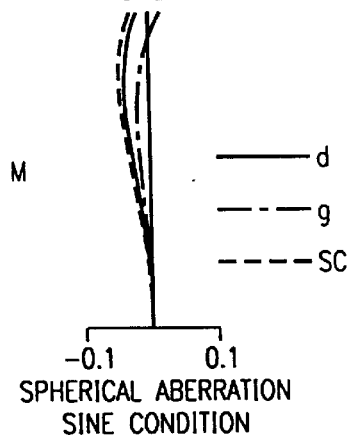
Figure 8E:
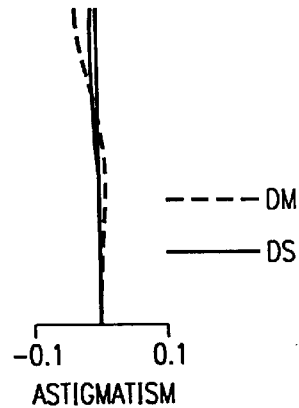
Figure 8F:
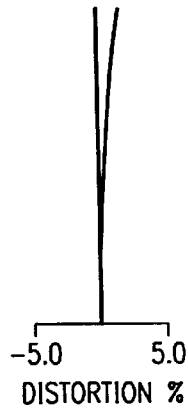
Figure 8G:
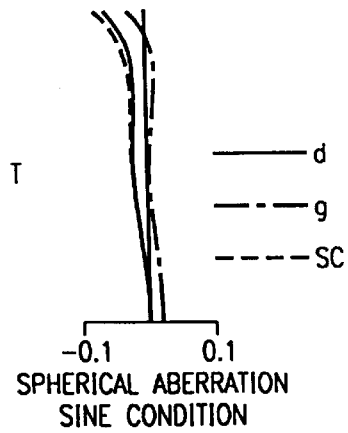
Figure 8H:
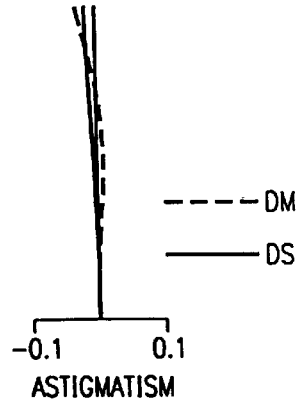
Figure 8I:
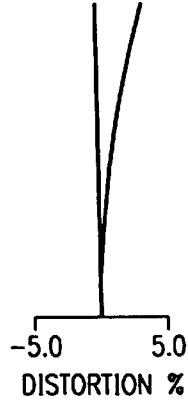
Figure 10A:
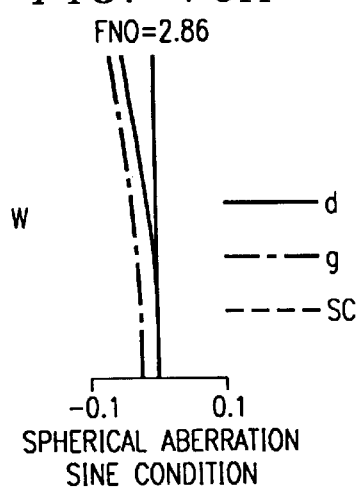
FIGS. 10A to 10I are aberration diagrams of Example 3.
Figure 10B:
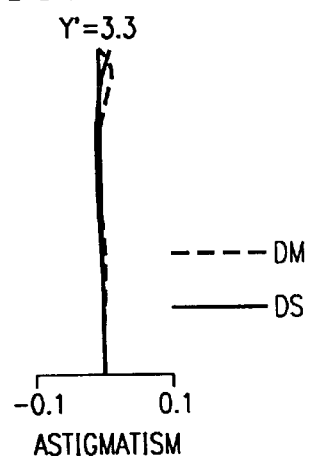
Figure 10C:
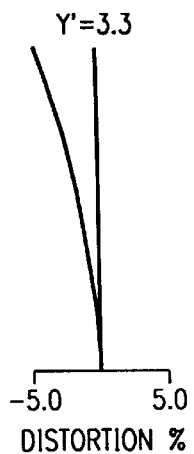
Figure 10D:
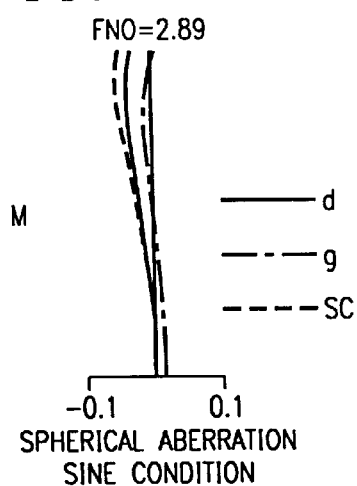
Figure 10E:
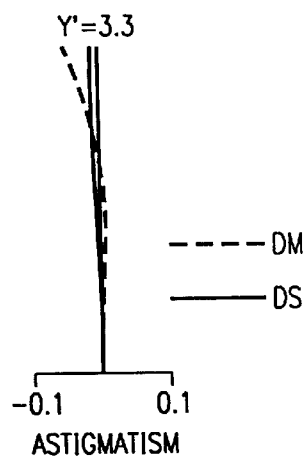
Figure 10F:
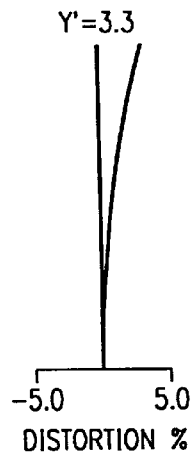
Figure 10G:
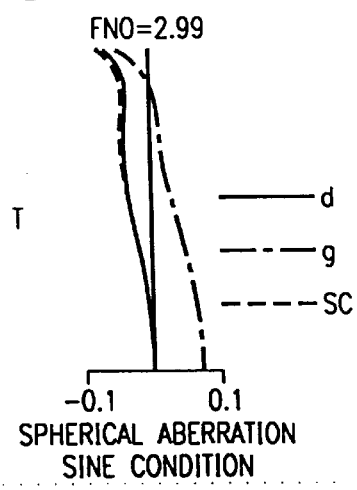
Figure 10H:
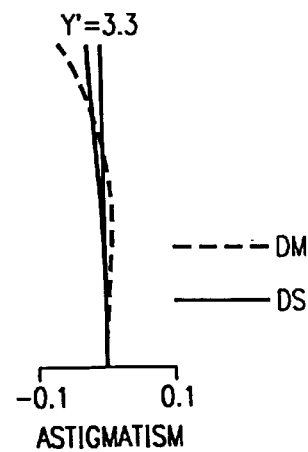
Figure 10I:
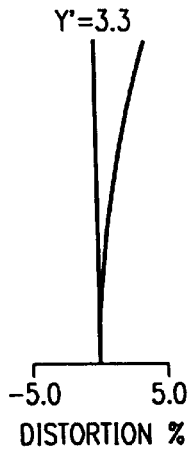
Figure 11A:
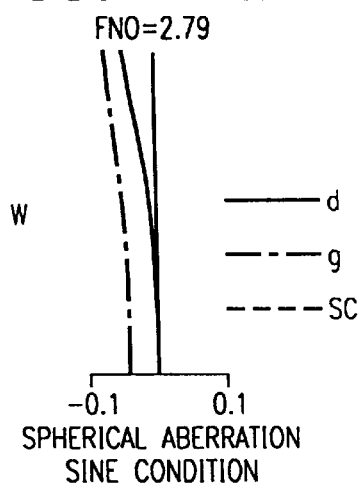
FIGS. 11A to 11I are aberration diagrams of Example 4.
Figure 11B:
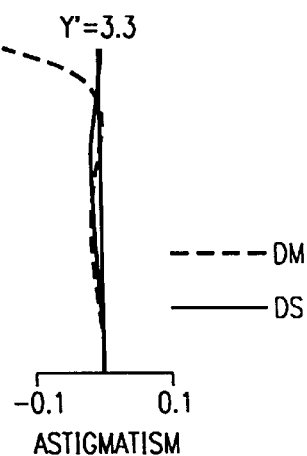
Figure 11C:
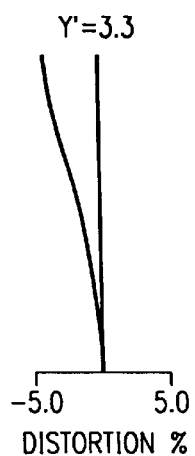
Figure 11D:
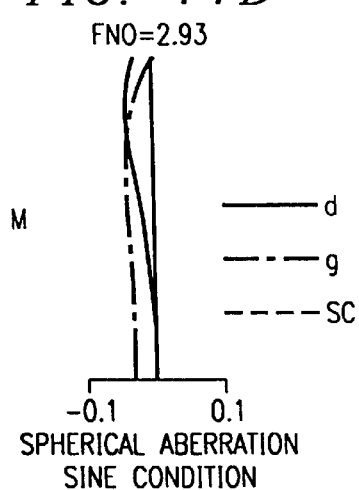
Figure 11E:
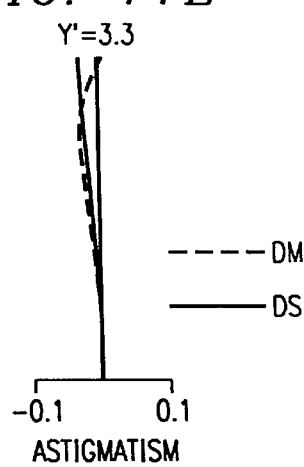
Figure 11F:
Figure 11G:
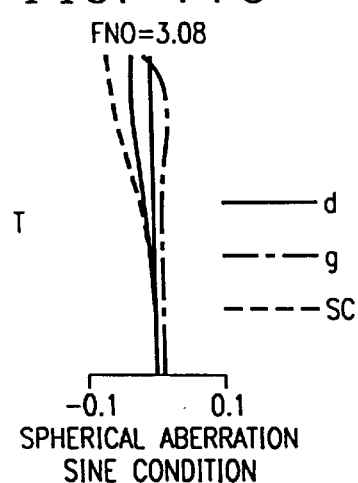
Figure 11H:
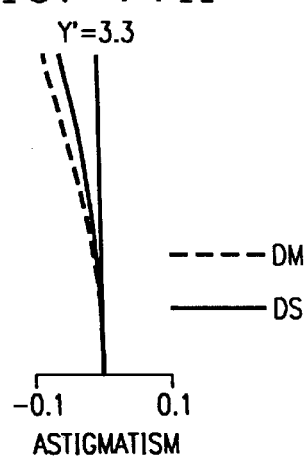
Figure 11I:
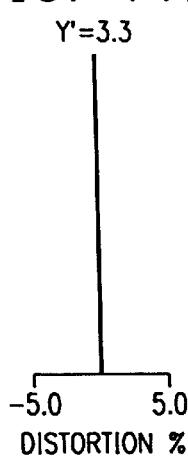
Figure 12A:
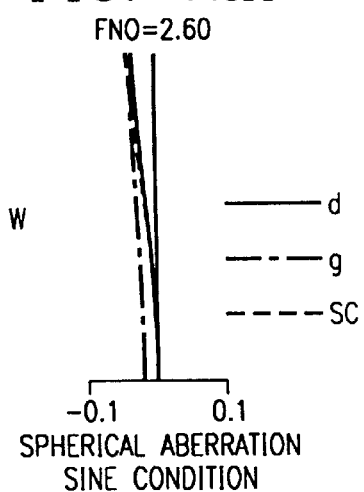
FIGS. 12A to 12I are aberration diagrams of Example 5.
Figure 12B:
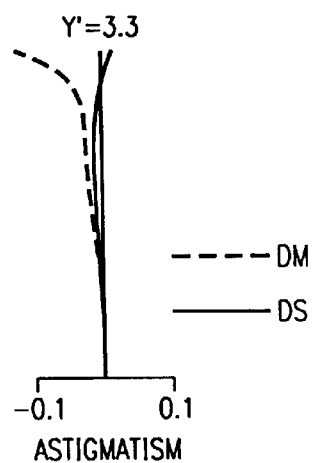
Figure 12C:
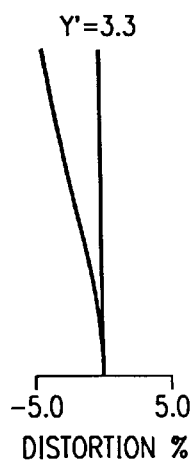
Figure 12D:
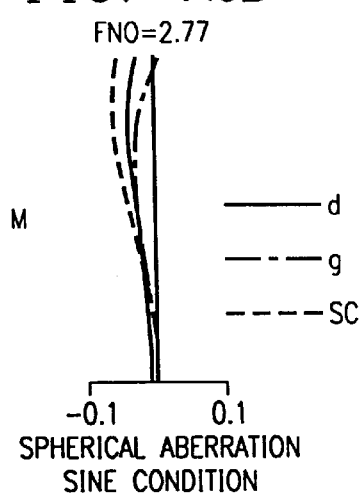
Figure 12E:
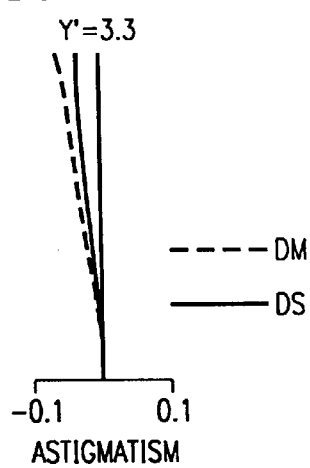
Figure 12F:
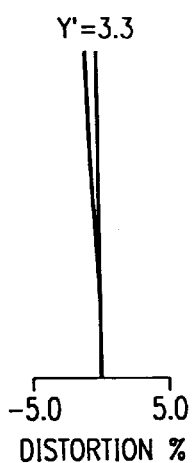
Figure 12G:
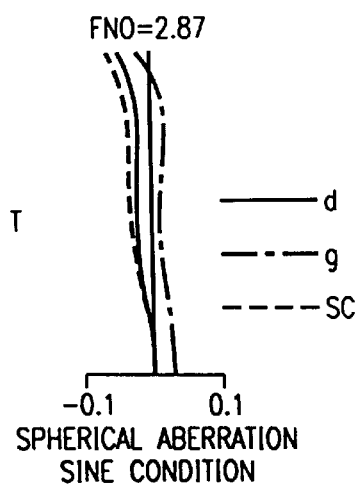
Figure 12H:
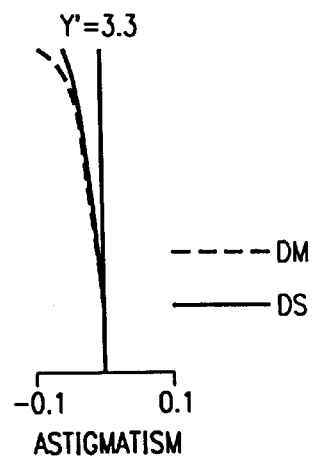
Figure 12I:
Figure 13A:
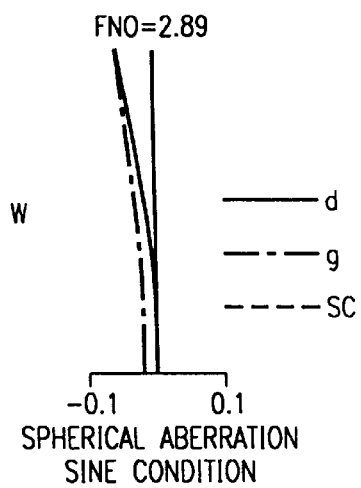
FIGS. 13A to 13I are aberration diagrams of Example 6.
Figure 13B:
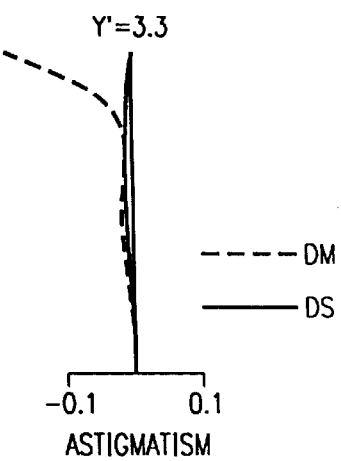
Figure 13C:
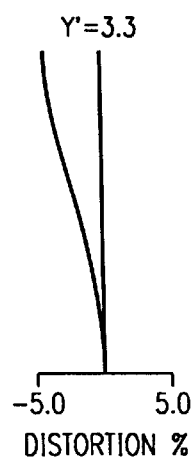
Figure 13D:
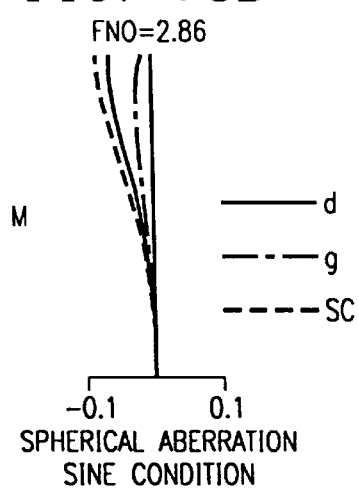
Figure 13E:
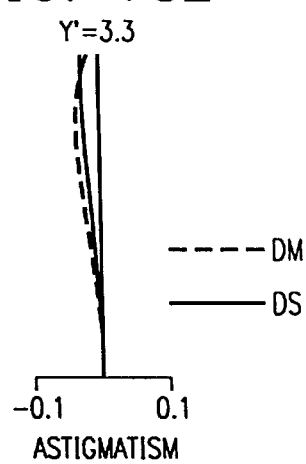
Figure 13F:
Figure 13G:
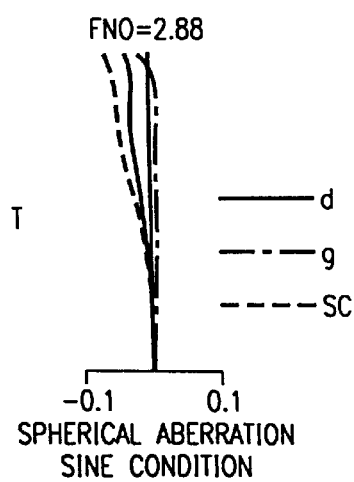
Figure 13H:
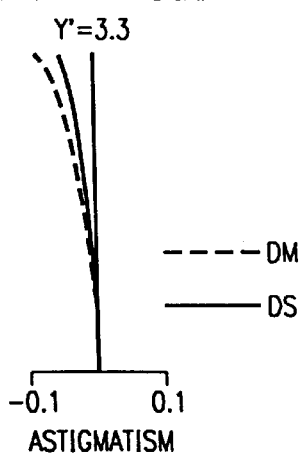
Figure 13I:
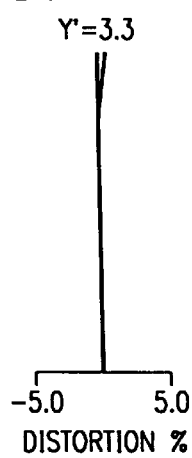
Figure 14A:
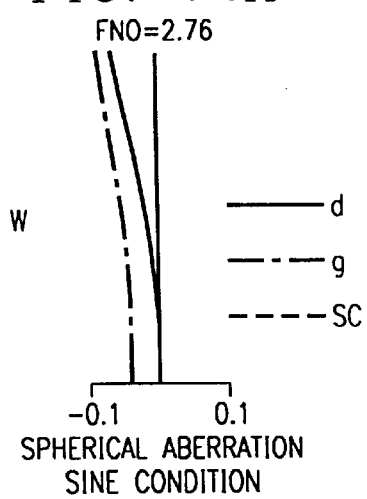
FIGS. 14A to 14I are aberration diagrams of Example 7.
Figure 14B:
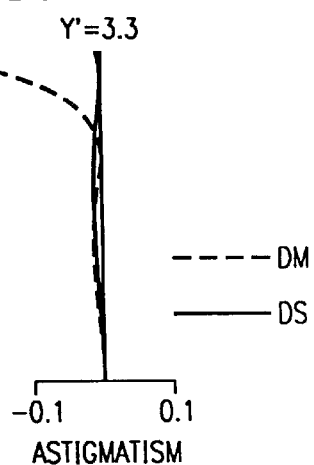
Figure 14C:
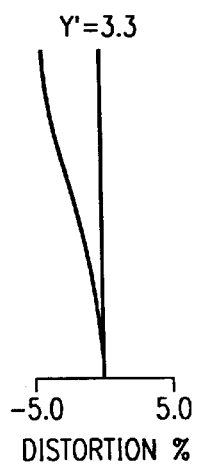
Figure 14D:
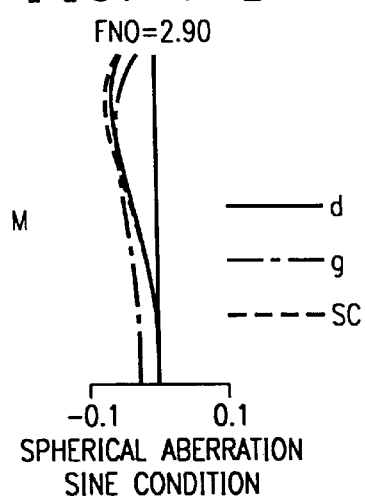
Figure 14E:
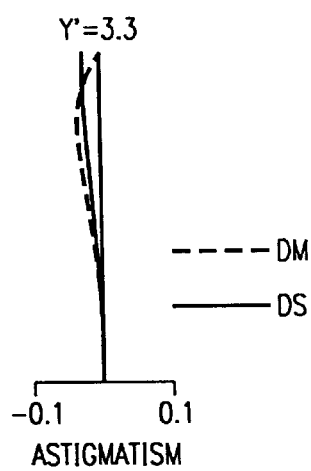
Figure 14F:
Figure 14G:
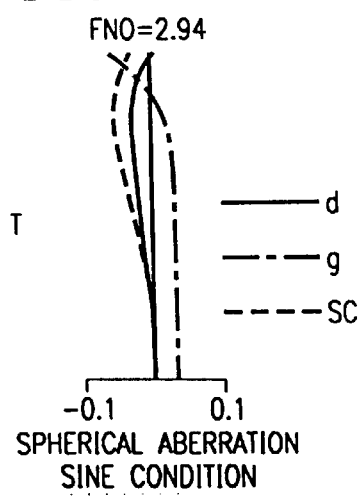
Figure 14H:
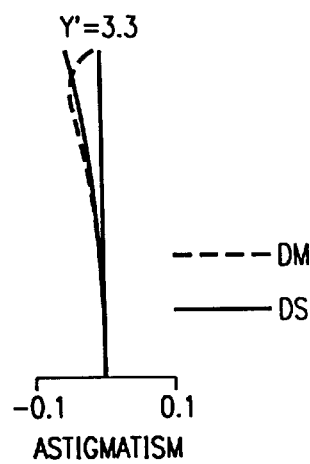
Figure 14I:
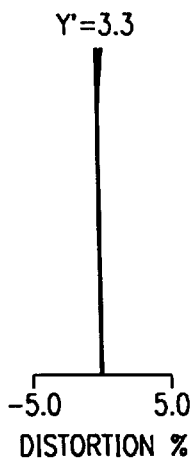

Hereinafter, optical or taking lens devices embodying the present invention will be described with reference to the drawings and the optical or taking lens device will be referred to as a taking lens device. A taking lens device optically takes in an image of a subject and then outputs the image as an electrical signal. A taking lens device is used as a main component of a camera which is employed to shoot a still or moving picture of a subject, for example, a digital still camera, a digital video camera, or a camera that is incorporated in or externally fitted to a device such as a digital video unit, a personal computer, a mobile computer, a portable telephone, or a personal digital assistant (PDA). A digital camera also includes a memory to store the image data from the image sensor. The memory may be removable, for example, a disk or the memory may be permanently installed in the camera. As shown in FIG. 15, a taking lens device is comprised of, from the object (subject) side, a taking lens system TL that forms an optical image of an object, a plane-parallel plate PL that functions as an optical low-pass filter or the like, and an image sensor SR that converts the optical image formed by the taking lens system TL into an electrical signal. FIG. 16 shows a zoom lens system ZL, an optical low-pass filter PL, an image sensor SR, processing circuits PC that would include any electronics needed to process the image, and a memory EM that could be used in a digital camera.

In all the embodiments described hereinafter, the taking lens system TL is built as a zoom lens system comprised of a plurality of lens units wherein zooming is achieved by moving two or more lens units along the optical axis AX in such a way that their unit-to-unit distances vary. The image sensor SR is realized, for example, with a solid-state image sensor such as a CCD or CMOS (complementary metal-oxide semiconductor) sensor having a plurality of pixels and, by this image sensor SR, the optical image formed by the zoom lens system is converted into an electrical signal. The optical image formed by the zoom lens system has its spatial frequency characteristics adjusted by being passed through the low-pass filter PL that has predetermined cut-off frequency characteristics that are determined by the pixel pitch of the image sensor SR. This helps minimize so-called aliasing noise that appears when the optical image is converted into an electrical signal. The signal produced by the image sensor SR is subjected, as required, to predetermined digital image processing, image compression, and other processing, and is then recorded as a digital image signal in a memory (such as a semiconductor memory or an optical disk) or, if required, is transmitted to another device by way of a cable or after being converted into an infrared signal.

FIGS. 1 to 7 are lens arrangement diagrams of the zoom lens system used in a first to a seventh embodiment, respectively, of the present invention, each showing the lens arrangement at the wide-angle end W in an optical sectional view. In each lens arrangement diagram, an arrow mj (where j=1, 2, ...) schematically indicates the movement of the j-th lens unit Grj and others during zooming from the wide-angle end W to the telephoto end T. Moreover, in each lens arrangement diagram, ri (i=1, 2, 3, ...) indicates the i-th surface from the object side and a surface ri marked with an asterisk (*) is an aspherical surface. Di (where i=1, 2, 3, ...) indicates the i-th axial distance from the object side, though only those which vary with zooming, called variable distances, are shown here.

In all of the embodiments, the zoom lens system is comprised of at least, from the object side, a first lens unit Gr1 having a negative optical power and a second lens unit Gr2 having a positive optical power, and achieves zooming by varying the distances between these lens units. In addition, designed for a camera (for example, a digital camera) provided with a solid-state image sensor (for example, a CCD), the zoom lens system also has a flat glass plate PL which is a glass plane-parallel plate that functions as an optical low-pass filter or the like disposed on the image-plane side thereof. In all of the embodiments, the flat glass plate PL is kept stationary during zooming and the second lens unit Gr2 includes an aperture stop ST at the object-side end thereof.

In the first to the fourth embodiments, the zoom lens system is built as a three-unit zoom lens of a negative-positive-positive configuration. In the fifth to the seventh embodiments, the zoom lens system is built as a four-unit zoom lens of a negative-positive-negative-positive configuration. In the first to the third embodiments, during zooming from the wide-angle end W to the telephoto end T, the first lens unit Gr1 first moves toward the image side and then makes a U-turn to go on to move toward the object side, the second lens unit Gr2 moves toward the object side, and the third lens unit Gr3 moves toward the image side. In the fourth embodiment, during zooming from the wide-angle end W to the telephoto end T, the first lens unit Gr1 first moves toward the image side and then makes a U-turn to go on to move toward the object side, and the second lens unit Gr3 moves toward the object side, but the third lens unit Gr3, i.e. the last lens unit, remains stationary together with the flat glass plate PL. In the fifth to the seventh embodiments, during zooming from the wide-angle end W to the telephoto end T, the first lens unit Gr1 first moves toward the image side and then makes a U-turn to go on to move toward the object side, and the second and third lens units Gr2, Gr3 move toward the object side, but the fourth lens unit Gr4, i.e., the last lens unit, remains stationary together with the flat glass plate PL.

In all of the embodiments, it is preferable that the zoom lens system, starting with a negative-positive configuration, fulfill the conditions described one by one below. Needless to say, those conditions may be fulfilled singly to achieve the effects and advantages associated with the respective conditions fulfilled, but fulfilling as many of them as possible is further preferable in terms of optical performance, miniaturization, and other aspects.

It is preferable that conditional formula (1) below be fulfilled.

$$2<|f1/fw|<4 \qquad (1)$$

where f1 represents the focal length of the first lens unit Gr1; and fw represents the focal length of the entire optical system at the wide-angle end W.

Conditional formula (1) defines the preferable focal length of the first lens unit Gr1. If the upper limit of conditional formula (1) were to be transgressed, the focal length of the first lens unit Gr1 would be too long, and thus the total length of the entire optical system would be too long. Moreover, the negative power of the first lens unit Gr1 would be so weak that this lens unit would need to be made larger in external diameter. Thus, it would be impossible to make the zoom lens system compact. By contrast, if the lower limit of conditional formula (1) were to be transgressed, the focal length of the first lens unit Gr1 would be too short. This would cause such a large negative distortion in the first lens unit Gr1 at the wide-angle end W that it would be difficult to correct the distortion.

It is preferable that conditional formula (2) below be fulfilled, and it is further preferably fulfilled together with conditional formula (1) noted previously.

$$0.058<(\tan \omega w)^2 \times fw/TLw<0.9 \qquad (2)$$

where tan ωw represents the half view angle at the wide-angle end W;

fw represents the focal length of the entire optical system at the wide-angle end W; and TLw represents the total length (i.e., the distance from the first vertex to the image plane) at the wide-angle end W.

Conditional formula (2) defines the preferable relation between the view angle and the total length at the wide-angle end W. If the upper limit of conditional formula (2) were to be transgressed, the individual lens units would have optical powers that were too strong, and thus it would be difficult to correct the aberration that occurs therein. By contrast, if the lower limit of conditional formula (2) were to be transgressed, the total length would be too long, which is undesirable in terms of miniaturization.

It is preferable that conditional formula (3) below be fulfilled, and it is further preferably fulfilled together with conditional formula (1) noted above.

$$10<TLw \times Fnt/(fw \times \tan \omega w)<40 \qquad (3)$$

where

TLw represents the total length (i.e., the distance from the first vertex to the image plane) at the wide-angle end W;

Fnt represents the f-number (FNO) at the telephoto end T;

fw represents the focal length of the entire optical system at the wide-angle end W; and tan ωw represents the half view angle at the wide-angle end W.

Conditional formula (3) defines the preferable relation between the total length at the wide-angle end W and the f-number at the telephoto end T. If the upper limit of conditional formula (3) were to be transgressed, the total length at the wide-angle end W would be too long, which is undesirable in terms of miniaturization. By contrast, if the lower limit of conditional formula (3) were to be transgressed, the f-number at the telephoto end T would be too low, and thus it would be difficult to correct the spherical aberration that would occur in the second lens unit Gr2 in that zoom position.

In all of the embodiments, the first lens unit Gr1 is comprised of, from the object side, a first lens element having a negative optical power, a second lens element having a negative optical power, and a third lens element having a positive optical power. It is preferable that, in this way, the first lens unit Gr1 be comprised of three lens elements, i.e. a negative, a negative, and a positive, and that conditional formula (4) below be fulfilled.

$$0.8<fl1/f1<1.5 \qquad (4)$$

where fl1 represents the focal length of the lens element disposed at the object-side end (i.e., the first lens element) of the first lens unit Gr1; and f1 represents the focal length of the first lens unit Gr1.

Conditional formula (4) defines the preferable focal length of the lens element disposed at the object-side end of the first lens unit Gr1. If the upper limit of conditional formula (4) were to be transgressed, the focal length of the first lens element would be too long. This would make the negative optical power of the first lens element too weak, and thus, this lens element would need to be made larger in external diameter. By contrast, if the lower limit of conditional formula (4) were to be transgressed, the focal length of the first lens element would be too short. This would cause a distortion so large (especially the negative distortion on the wide-angle side) that it would be impossible to secure satisfactory optical performance.

It is preferable that the second lens unit Gr2 be comprised of at least, as in all of the embodiments, two positive lens elements and one negative lens element. Moreover, it is further preferable that, as in the first to the fourth, the sixth, and the seventh embodiments, the second lens unit Gr2 have an aspherical surface at the image-side end thereof Let the maximum effective optical path radius of an aspherical surface be Ymax, and let the height in a direction perpendicular to the optical axis be Y. Then, it is preferable that the aspherical surface disposed at the image-side end of the second lens unit Gr2 fulfill conditional formula (5) below at Y=0.7Ymax, and further preferably for any height Y in the range $0.1Ymax \leq Y \leq 0.7Ymax$.

$$-0.6<(|X|-|X0|)/[C0 \cdot (N'-N) \cdot f2]<0 \qquad (5)$$

where

X represents the surface shape (mm) of the aspherical surface (i.e., the displacement along the optical axis at the height Y in a direction perpendicular to the optical axis of the aspherical surface), X0 represents the surface shape (mm) of the reference spherical surface of the aspherical surface (i.e., the displacement along the optical axis at the height Y in a direction perpendicular to the optical axis of the reference spherical surface);

C0 represents the curvature ($mm^{-1}$) of the reference spherical surface of the aspherical surface;

N represents the refractive index for the d-line of the object-side medium of the aspherical surface;

N' represents the refractive index for the d-line of the image-side medium of the aspherical surface; and f2 represents the focal length (mm) of the second lens unit Gr2.

Here, the surface shape X of the aspherical surface, and the surface shape X0 of its reference spherical surface are respectively given by formulae (AS) and (RE) below.

$$X = (C0 \cdot Y^2)/(1+\sqrt{1-\epsilon \cdot C0^2 \cdot Y^2}) + \Sigma(Ai \cdot Y^i) \quad (AS)$$

$$X0 = (C0 \cdot Y^2)/(1+\sqrt{1-C0^2 \cdot Y^2}) \quad (RE)$$

where

C0 represents the curvature (mm$^{-1}$) of the reference spherical surface of the aspherical surface;

Y represents the height in a direction perpendicular to the optical axis;

$\epsilon$ represents the quadric surface parameter; and

Ai represents the aspherical surface coefficient of order i.

Conditional formula (5) dictates that the aspherical surface be so shaped as to weaken the positive power within the second lens unit Gr2, and thus defines the preferable condition to be fullfilled to ensure proper correction of spherical aberration from the middle-focal-length region M to the telephoto end T. If the upper limit of conditional formula (5) were to be transgressed, spherical aberration would incline too much toward the under side. By contrast, if the lower limit of conditional formula (5) were to be transgressed, the spherical aberration would incline too much toward the over side.

It is preferable that, as in all of the embodiments, the zoom unit disposed closest to the image plane have a positive optical power. The zoom unit having this positive optical power includes one or more positive lens elements. It is preferable that, of those positive lens elements, the one disposed closest to the image plane fulfill conditional formula (6) below.

$$1.6 < NL \quad (6)$$

where

NL represents the refractive index for the d-line of the positive lens element disposed closest to the image plane within the zoom unit disposed closest to the image plane.

The conditional formula (6) defines the preferable refractive index of this positive lens element. If the lower limit of conditional formula (6) were to be transgressed, the positive lens element would have too sharp a curvature and cause such a large aberration that it would be difficult to correct the aberration.

It is preferable that the first and second lens units Gr1, Gr2 fulfill conditional formula (7) below.

$$1 < |f1/f2| < 1.5 \quad (7)$$

wherein f1 represents the focal length of the first lens unit Gr1; and f2 represents the focal length of the second lens unit Gr2.

Conditional formula (7) defines the preferable ratio of the focal length of the first lens unit Gr1 to that of the second lens unit Gr2. If the upper limit of conditional formula (7) were to be transgressed, the focal length of the first lens unit Gr1 would be relatively too long, which would make the overall lens arrangement deviate from a retrofocus-type arrangement at the wide-angle end W. This would be undesirable because, as a result, the exit pupil would be located closer to the image plane. The reason is that in a digital still camera or the like, the use of a CCD, and other factors, require that rays striking the image plane be telecentric and, therefore, it is preferable that the exit pupil be located closer to the object. By contrast, if the lower limit of conditional formula (7) were to be transgressed, the focal length of the first lens unit Gr1 would be relatively too short, which would make it difficult to correct the negative distortion that would occur in the first lens unit Gr1.

In all of the first to the seventh embodiments, all of the lens units are comprised solely of refractive lenses that deflect light incident thereon by refraction (i.e., lenses of the type that deflect light at the interface between two media having different refractive indices). However, any of these lens units may include, for example, a diffractive lens that deflects light incident thereon by diffraction, a refractive-diffractive hybrid lens that deflects light incident thereon by the combined effects of refraction and diffraction, a gradient-index lens that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the midst of the zoom lens system. Where to bend the optical path may be determined to suit particular needs. By bending the optical path appropriately, it is possible to make a camera slimmer. It is possible even to build an arrangement in which zooming or the collapsing movement of a lens barrel does not cause any change in the thickness of a camera. For example, by keeping the first lens unit Gr1 stationary during zooming, and disposing a mirror behind the first lens unit Gr1 so that the optical path is bent by 90° by the reflecting surface of the mirror, it is possible to keep the front-to-rear length of the zoom lens system constant and thereby make a camera slimmer.

In all of the embodiments, an optical low-pass filter, having the shape of a plane-parallel plate PL, is disposed between the last surface of the zoom lens system and the image sensor SR. However, it is also possible to use a birefringence-type low-pass filter made of quartz, or the like, having its crystal axis aligned with a predetermined direction, or a phase-type low-pass filter that achieves the required optical cut-off frequency characteristics by exploiting diffraction, or a low-pass filter of any other type.

PRACTICAL EXAMPLES

Hereinafter, practical examples of the construction of the zoom lens system used in taking lens devices embodying the present invention will be presented in more detail with reference to their construction data, aberration diagrams, and other data. Examples 1 to 7 presented below respectively correspond to the first to the seventh embodiments described hereinbefore, and the lens arrangement diagrams (FIGS. 1 to 7) showing the lens arrangement of the first to the seventh embodiments apply also to Examples 1 to 7, respectively.

Tables 1 to 7 list the construction data of Examples 1 to 7, respectively. In the construction data of each example, ri (i=1, 2, 3, . . . ) represents the radius of curvature (in mm) of the i-th surface from the object side, di (i=1, 2, 3, . . . ) represents the i-th axial distance (in mm) from the object side, and Ni (i=1, 2, 3, . . . ) and vi (i=1, 2, 3, . . . ) respectively, represent the refractive index Nd for the d-line and the Abbe number (vd) of the i-th optical element from the object side. A surface whose radius of curvature, ri, is marked with an asterisk (*) is an aspherical surface, of which the surface shape is defined by formula (AS) noted earlier. Moreover, in the construction data, for each of those axial distances that vary with zooming (i.e., variable aerial distances), three values are given that are, from left, the axial distance at the wide-angle end W (the shortest-focal-length end), the axial distance in the middle position M (the middle-focal-length position), and the axial distance at the telephoto end T (the longest-focal-length end). Also listed are the focal length f (in mm), the f-number FNO, and the view angle (2ω, °) of the entire optical system in those three focal-length positions W, M, and T, and the aspherical surface data. Table 8 lists the values of the conditional formulae as actually observed in Examples 1 to 7.

FIGS. 8A–8I, 9A–9I, 10A–10I, 11A–11I, 12A–12I, 13A–13I, and 14A–14I are aberration diagrams of Examples 1 to 7, respectively. Of these diagrams, FIGS. 8A–8C, 9A–9C, 10A–10C, 11A–11C, 12A–12C, 13A–13C, and 14A–14C show the aberration observed at the wide-angle end W, FIGS. 8D–8F, 9D–9F, 10D–10F, 11D–11F, 12D–12F, 13D–13F, and 14D–14F show the aberration observed in the middle position M, and FIGS. 8G–8I, 9G–9I, 10G–10I, 11G–11I, 12G–12I, 13G–13I, and 14G–14I show the aberration observed at the telephoto end T. Of these diagrams, FIGS. 8A, 8D, 8G, 9A, 9D, 9G, 10A, 10D, 10G, 11A, 11D, 11G, 12A, 12D, 12G, 13A, 13D, 13G, 14A, 14D, and 14G show spherical aberration, FIGS. 8B, 8E, 8H, 9B, 9E, 9H, 10B, 10E, 10H, 11B, 11E, 11H, 12B, 12E, 12H, 13B, 13E, 13H, 14B, 14E, and 14H show astigmatism, and FIG. 8C, 8F, 8I, 9C, 9F, 9I, 10C, 10F, 10I, 11C, 11F, 11I, 12C, 12F, 12I, 13C, 13F, 13I, 14C, 14F, and 14I show distortion. In these diagrams, Y' represents the maximum image height (mm). In the diagrams showing spherical aberration, a solid line d and a dash-and-dot line g show the spherical aberration for the d-line and for the g-line, respectively, and a broken line SC shows the sine condition. In the diagrams showing astigmatism, a broken line DM and a solid line DS represent the astigmatism for the d-line on the meridional plane and on the sagittal plane, respectively. In the diagrams showing distortion, a solid line represents the distortion (%) for the d-line.

TABLE 1

Construction Data of Example 1
f = 4.45–7.8–12.7, FNO = 2.58–2.79–2.87, 2ω = 76.8–45.9–28.5

| Radius of Curvature | Axial Distance | Refractive Index | Abbe Number |
|---|---|---|---|
| r1 = 19.698 | | | |
| | d1 = 0.800 | N1 = 1.54072 | ν1 = 47.22 |
| r2 = 5.198 | | | |
| | d2 = 3.187 | | |
| r3* = −29.535 | | | |
| | d3 = 0.800 | N2 = 1.52200 | ν2 = 52.20 |
| r4* = 8.903 | | | |
| | d4 = 1.149 | | |
| r5 = 13.334 | | | |
| | d5 = 1.500 | N3 = 1.84666 | ν3 = 23.82 |
| r6 = 97.326 | | | |
| | d6 = 12.312~5.000~1.000 | | |
| r7 = ∞ (ST) | | | |
| | d7 = 0.600 | | |
| r8 = 9.366 | | | |
| | d8 = 1.705 | N4 = 1.75450 | ν4 = 51.57 |
| r9 = 40.867 | | | |
| | d9 = 0.100 | | |
| r10 = 6.624 | | | |
| | d10 = 2.251 | N5 = 1.75450 | ν5 = 51.57 |
| r11 = 39.738 | | | |
| | d11 = 0.448 | | |
| r12 = −1936.446 | | | |
| | d12 = 0.800 | N6 = 1.84666 | ν6 = 23.82 |
| r13 = 4.801 | | | |
| | d13 = 0.783 | | |
| r14 = 5.654 | | | |
| | d14 = 2.567 | N7 = 1.52200 | ν7 = 52.20 |
| r15* = 76.172 | | | |
| | d15 = 1.233~5.941~11.857 | | |
| r16* = 50.000 | | | |
| | d16 = 3.000 | N8 = 1.75450 | ν8 = 51.57 |
| r17* = −10.441 | | | |
| | d17 = 2.066~1.344~0.700 | | |
| r18 = ∞ | | | |
| | d18 = 2.000 | N9 = 1.51680 | ν9 = 64.20 |
| r19 = ∞ | | | |

Aspherical Surface Data of Surface r3
$\epsilon = 1.0000$, $A4 = 0.64512 \times 10^{-3}$, $A6 = -0.27859 \times 10^{-4}$, $A8 = 0.45026 \times 10^{-6}$
Aspherical Surface Data of Surface r4
$\epsilon = 1.0000$, $A4 = 0.80350 \times 10^{-4}$, $A6 = -0.35506 \times 10^{-4}$, $A8 = 0.33543 \times 10^{-6}$
Aspherical Surface Data of Surface r15
$\epsilon = 1.0000$, $A4 = 0.15384 \times 10^{-2}$, $A6 = 0.33120 \times 10^{-4}$, $A8 = 0.84739 \times 10^{-6}$
Aspherical Surface Data of Surface r16
$\epsilon = 1.0000$, $A4 = -0.55664 \times 10^{-3}$, $A6 = 0.19026 \times 10^{-4}$, $A8 = 0.16174 \times 10^{-5}$
Aspherical Surface Data of Surface r17
$\epsilon = 1.0000$, $A4 = 0.15165 \times 10^{-4}$, $A6 = -0.23729 \times 10^{-4}$, $A8 = 0.13818 \times 10^{-5}$

TABLE 2

Construction Data of Example 2
f = 4.45~7.8~12.7, FNO = 2.67~2.74~2.85, 2ω = 76.8~45.8~28.5

| Radius of Curvature | Axial Distance | Refractive Index | Abbe Number |
|---|---|---|---|
| r1 = 14.632 | | | |
| | d1 = 1.200 | N1 = 1.63854 | ν1 = 55.45 |
| r2 = 5.291 | | | |
| | d2 = 3.121 | | |
| r3* = −50.614 | | | |
| | d3 = 0.800 | N2 = 1.52200 | ν2 = 52.20 |
| r4* = 8.793 | | | |
| | d4 = 1.254 | | |
| r5 = 13.002 | | | |
| | d5 = 1.500 | N3 = 1.84666 | ν3 = 23.78 |
| r6 = 47.454 | | | |
| | d6 = 12.829~4.984~1.000 | | |
| r7 = ∞ (ST) | | | |
| | d7 = 0.600 | | |
| r8 = 9.785 | | | |
| | d8 = 1.718 | N4 = 1.75450 | ν4 = 51.57 |
| r9 = 90.532 | | | |
| | d9 = 0.100 | | |
| r10 = 6.759 | | | |
| | d10 = 2.391 | N5 = 1.75450 | ν5 = 51.57 |
| r11 = −55.645 | | | |
| | d11 = 0.010 | | |
| r12 = −55.645 | | | |
| | d12 = 0.800 | N6 = 1.84666 | ν6 = 23.78 |
| r13 = 6.185 | | | |
| | d13 = 1.008 | | |
| r14 = 11.519 | | | |
| | d14 = 1.500 | N7 = 1.52200 | ν7 = 52.20 |
| r15* = 47.508 | | | |
| | d15 = 1.274~5.149~10.638 | | |
| r16* = −50.000 | | | |
| | d16 = 1.000 | N8 = 1.52200 | ν8 = 52.20 |
| r17* = 54.977 | | | |
| | d17 = 0.500 | | |
| r18 = −37.700 | | | |
| | d18 = 1.697 | N9 = 1.74330 | ν9 = 49.22 |
| r19 = −8.717 | | | |
| | d19 = 1.998~1.556~0.700 | | |
| r20 = ∞ | | | |
| | d20 = 2.000 | N10 = 1.51680 | ν10 = 64.20 |
| r21 = ∞ | | | |

Aspherical Surface Data of Surface r3
$\epsilon = 1.0000$, $A4 = 0.30044 \times 10^{-3}$, $A6 = 0.16934 \times 10^{-4}$, $A8 = 0.30140 \times 10^{-6}$
Aspherical Surface Data of Surface r4
$\epsilon = 1.0000$, $A4 = -0.19783 \times 10^{-3}$, $A6 = -0.24114 \times 10^{-4}$, $A8 = 0.19804 \times 10^{-6}$
Aspherical Surface Data of Surface r15
$\epsilon = 1.0000$, $A4 = 0.16258 \times 10^{-2}$, $A6 = 0.48852 \times 10^{-4}$, $A8 = 0.29045 \times 10^{-5}$
Aspherical Surface Data of Surface r16
$\epsilon = 1.0000$, $A4 = -0.77998 \times 10^{-3}$, $A6 = -0.62254 \times 10^{-4}$, $A8 = 0.48012 \times 10^{-5}$
Aspherical Surface Data of Surface r17
$\epsilon = 1.0000$, $A4 = 0.46037 \times 10^{-3}$, $A6 = -0.64216 \times 10^{-4}$, $A8 = 0.39644 \times 10^{-5}$

TABLE 3

Construction Data of Example 3
f = 5.0~9.7~15.0, FNO = 2.86~2.89~2.99, 2ω = 70.4~36.9~24.3

| Radius of Curvature | Axial Distance | Refractive Index | Abbe Number |
|---|---|---|---|
| r1 = 16.568 | | | |
| | d1 = 0.800 | N1 = 1.54072 | ν1 = 47.22 |
| r2 = 5.660 | | | |
| | d2 = 3.185 | | |
| r3* = −14.604 | | | |
| | d3 = 0.800 | N2 = 1.52200 | ν2 = 52.20 |
| r4* = 15.524 | | | |
| | d4 = 0.977 | | |
| r5 = 15.491 | | | |
| | d5 = 1.500 | N3 = 1.84666 | ν3 = 23.82 |
| r6 = 111.102 | | | |
| | d6 = 12.025~4.233~1.000 | | |

TABLE 3-continued

| | Radius of Curvature | | Axial Distance | | Refractive Index | | Abbe Number |
|---|---|---|---|---|---|---|---|
| r7 = | ∞ (ST) | | | | | | |
| | | d7 = | 0.600 | | | | |
| r8 = | 12.131 | | | | | | |
| | | d8 = | 1.741 | N4 = | 1.75450 | ν4 = | 51.57 |
| r9 = | 584.092 | | | | | | |
| | | d9 = | 0.100 | | | | |
| r10 = | 6.314 | | | | | | |
| | | d10 = | 2.408 | N5 = | 1.75450 | ν5 = | 51.57 |
| r11 = | 24.913 | | | | | | |
| | | d11 = | 0.391 | | | | |
| r12 = | 34.532 | | | | | | |
| | | d12 = | 0.800 | N6 = | 1.84666 | ν6 = | 23.82 |
| r13 = | 4.307 | | | | | | |
| | | d13 = | 0.932 | | | | |
| r14 = | 4.479 | | | | | | |
| | | d14 = | 2.833 | N7 = | 1.52200 | ν7 = | 52.20 |
| r15* = | 9.931 | | | | | | |
| | | d15 = | 1.539~7.549~13.230 | | | | |
| r16* = | −50.000 | | | | | | |
| | | d16 = | 1.800 | N8 = | 1.75450 | ν8 = | 51.57 |
| r17* = | −9.004 | | | | | | |
| | | d17 = | 1.867~1.071~0.700 | | | | |
| r18 = | ∞ | | | | | | |
| | | d18 = | 2.000 | N9 = | 1.51680 | ν9 = | 64.20 |
| r19 = | ∞ | | | | | | |

Aspherical Surface Data of Surface r3
$\epsilon = 1.0000$, $A4 = 0.45929 \times 10^{-3}$, $A6 = -0.16445 \times 10^{-4}$, $A8 = 0.97268 \times 10^{-7}$
Aspherical Surface Data of Surface r4
$\epsilon = 1.0000$, $A4 = 0.19952 \times 10^{-3}$, $A6 = -0.18580 \times 10^{-4}$, $A8 = 0.13169 \times 10^{-6}$
Aspherical Surface Data of Surface r15
$\epsilon = 1.0000$, $A4 = 0.23318 \times 10^{-2}$, $A6 = 0.53861 \times 10^{-4}$, $A8 = 0.80431 \times 10^{-5}$
Aspherical Surface Data of Surface r16
$\epsilon = 1.0000$, $A4 = -10.66612 \times 10^{-3}$, $A6 = 0.10988 \times 10^{-4}$, $A8 = 0.73776 \times 10^{-6}$
Aspherical Surface Data of Surface r17
$\epsilon = 1.0000$, $A4 = 0.57518 \times 10^{-4}$, $A6 = 0.25791 \times 10^{-5}$, $A8 = 0.75725 \times 10^{-6}$

TABLE 4

Construction Data of Example 4
f = 5.0~9.5~15.0, FNO = 2.79~2.93~3.08, 2ω = 70.1~39.1~25.1

| | Radius of Curvature | | Axial Distance | | Refractive Index | | Abbe Number |
|---|---|---|---|---|---|---|---|
| r1 = | 13.015 | | | | | | |
| | | d1 = | 0.800 | N1 = | 1.85000 | ν1 = | 40.04 |
| r2 = | 5.379 | | | | | | |
| | | d2 = | 3.000 | | | | |
| r3* = | −16.773 | | | | | | |
| | | d3 = | 0.800 | N2 = | 1.52200 | ν2 = | 52.20 |
| r4* = | 22.729 | | | | | | |
| | | d4 = | 0.800 | | | | |
| r5 = | 13.773 | | | | | | |
| | | d5 = | 1.500 | N3 = | 1.84666 | ν3 = | 23.82 |
| r6 = | 92.478 | | | | | | |
| | | d6 = | 12.360~4.146~0.800 | | | | |
| r7 = | ∞ (ST) | | | | | | |
| | | d7 = | 0.600 | | | | |
| r8 = | 12.752 | | | | | | |
| | | d8 = | 2.183 | N4 = | 1.75450 | ν4 = | 51.57 |
| r9 = | −40.474 | | | | | | |
| | | d9 = | 0.100 | | | | |
| r10 = | 5.681 | | | | | | |
| | | d10 = | 2.991 | N5 = | 1.65100 | ν5 = | 55.78 |
| r11 = | −64.723 | | | | | | |
| | | d11 = | 0.010 | N6 = | 1.51400 | ν6 = | 42.83 |
| r12 = | −64.723 | | | | | | |
| | | d12 = | 0.735 | N7 = | 1.84666 | ν7 = | 23.82 |
| r13 = | 6.146 | | | | | | |
| | | d13 = | 1.351 | | | | |
| r14* = | −8.613 | | | | | | |
| | | d14 = | 1.500 | N8 = | 1.58340 | ν8 = | 30.23 |
| r15* = | −5.190 | | | | | | |
| | | d15 = | 1.150 | | | | |
| r16 = | −5.610 | | | | | | |
| | | d16 = | 1.000 | N9 = | 1.84666 | ν9 = | 23.82 |

TABLE 4-continued

| | | | | | | | |
|---|---|---|---|---|---|---|---|
| r17* = | −11.463 | | | | | | |
| | | d17 = | 0.891~6.019~12.287 | | | | |
| r18 = | 14.286 | | | | | | |
| | | d18 = | 1.800 | N10 = | 1.74330 | ν10 = | 49.22 |
| r19 = | −39.143 | | | | | | |
| | | d19 = | 0.729 | | | | |
| r20 = | ∞ | | | | | | |
| | | d20 = | 2.000 | N11 = | 1.51680 | ν11 = | 64.20 |
| r21 = | ∞ | | | | | | |

Aspherical Surface Data of Surface r3
$\epsilon = 1.0000$, $A4 = 0.14896 \times 10^{-2}$, $A6 = -0.77366 \times 10^{-4}$, $A8 = 0.22258 \times 10^{-5}$
Aspherical Surface Data of Surface r4
$\epsilon = 1.0000$, $A4 = 0.10851 \times 10^{-2}$, $A6 = -0.72877 \times 10^{-4}$, $A8 = 0.17235 \times 10^{-5}$
Aspherical Surface Data of Surface r14
$\epsilon = 1.0000$, $A4 = 0.49687 \times 10^{-3}$, $A6 = 0.37785 \times 10^{-3}$, $A8 = -0.12728 \times 10^{-4}$
Aspherical Surface Data of Surface r15
$\epsilon = 1.0000$, $A4 = 0.36388 \times 10^{-2}$, $A6 = 0.31081 \times 10^{-3}$, $A8 = 0.33280 \times 10^{-5}$
Aspherical Surface Data of Surface r17
$\epsilon = 1.0000$, $A4 = -0.96914 \times 10^{-3}$, $A6 = 0.57013 \times 10^{-5}$, $A8 = 0.32987 \times 10^{-5}$

TABLE 5

Construction Data of Example 5
$f = 4.45\sim7.8\sim12.7$, $FNO = 2.60\sim2.77\sim2.87$, $2\omega = 76.7\sim46.9\sim29.7$

| Radius of Curvature | | Axial Distance | | Refractive Index | | Abbe Number | |
|---|---|---|---|---|---|---|---|
| r1 = | 11.204 | | | | | | |
| | | d1 = | 0.800 | N1 = | 1.85000 | ν1= | 40.04 |
| r2 = | 5.369 | | | | | | |
| | | d2 = | 3.022 | | | | |
| r3* = | −29.266 | | | | | | |
| | | d3 = | 0.800 | N2 = | 1.5220 | ν2 = | 52.20 |
| r4* = | 9.534 | | | | | | |
| | | d4 = | 1.249 | | | | |
| r5 = | 12.353 | | | | | | |
| | | d5 = | 1.500 | N3 = | 1.84666 | ν3 = | 23.82 |
| r6 = | 53.629 | | | | | | |
| | | d6 = | 12.771~4.939~1.000 | | | | |
| r7 = | ∞ (ST) | | | | | | |
| | | d7 = | 0.600 | | | | |
| r8 = | 10.266 | | | | | | |
| | | d8 = | 1.683 | N4 = | 1.7433 | ν4 = | 49.22 |
| r9 = | 65.992 | | | | | | |
| | | d9 = | 0.100 | | | | |
| r10 = | 6.571 | | | | | | |
| | | d10 = | 2.168 | N5 = | 1.78831 | ν5 = | 47.32 |
| r11 = | 23.153 | | | | | | |
| | | d11 = | 0.489 | | | | |
| r12 = | 82.936 | | | | | | |
| | | d12 = | 0.800 | N6 = | 1.84666 | ν6 = | 23.82 |
| r13 = | 4.577 | | | | | | |
| | | d13 = | 0.891 | | | | |
| r14 = | 6.798 | | | | | | |
| | | d14 = | 1.583 | N7 = | 1.7859 | ν7 = | 43.93 |
| r15 = | −210.198 | | | | | | |
| | | d15 = | 0.900~1.497~1.940 | | | | |
| r16 = | 1733.884 | | | | | | |
| | | d16 = | 1.000 | N8 = | 1.84666 | ν8 = | 23.82 |
| r17* = | 18.608 | | | | | | |
| | | d17 = | 1.643~4.972~10.367 | | | | |
| r18 = | 38.411 | | | | | | |
| | | d18 = | 1.800 | N9 = | 1.7433 | ν9 = | 49.22 |
| r19 = | −14.382 | | | | | | |
| | | d19 = | 1.500 | | | | |
| r20 = | ∞ | | | | | | |
| | | d20 = | 2000 | N10 = | 1.51680 | ν10 = | 64.20 |
| r21 = | ∞ | | | | | | |

Aspherical Surface Data of Surface r3
$\epsilon = 1.0000$, $A4 = 0.75089 \times 10^{-3}$, $A6 = -0.20026 \times 10^{-4}$, $A8 = 0.27636 \times 10^{-6}$
Aspherical Surface Data of Surface r4
$\epsilon = 1.0000$, $A4 = 0.36810 \times 10^{-3}$, $A6 = -0.27602 \times 10^{-4}$, $A8 = 0.84054 \times 10^{-7}$
Aspherical Surface Data ofSurface r17
$\epsilon = 1.0000$, $A4 = 0.96706 \times 10^{-3}$, $A6 = 0.39808 \times 10^{-4}$, $A8 = -0.28248 \times 10^{-5}$

TABLE 6

Construction Data of Example 6
f = 4.45~7.8~12.7, FNO = 2.89~2.86~2.88, 2ω = 76.7~46.9~29.4

| Radius of Curvature | Axial Distance | Refractive Index | Abbe Number |
|---|---|---|---|
| r1 = 10.526 | | | |
| | d1 = 1.200 | N1 = 1.85000 | ν1 = 40.04 |
| r2 = 5.077 | | | |
| | d2 = 3.231 | | |
| r3* = −21.070 | | | |
| | d3 = 0.800 | N2 = 1.5220 | ν2 = 52.20 |
| r4* = 10.927 | | | |
| | d4 = 1.982 | | |
| r5 = 15.886 | | | |
| | d5 = 1.500 | N3 = 1.84666 | ν3 = 23.82 |
| r6 = 174.288 | | | |
| | d6 = 12.380~4.928~0.800 | | |
| r7 = ∞ (ST) | | | |
| | d7 = 0.600 | | |
| r8 = 9.287 | | | |
| | d8 = 2.306 | N4 = 1.7545 | ν4 = 51.57 |
| r9 = −349.383 | | | |
| | d9 = 0.100 | | |
| r10 = 6.640 | | | |
| | d10 = 2.719 | N5 = 1.6510 | ν5 = 55.78 |
| r11 = −23.819 | | | |
| | d11 = 0.010 | N6 = 1.5140 | ν6 = 42.83 |
| r12 = −23.819 | | | |
| | d12 = 0.700 | N7 = 1.84666 | ν7 = 23.82 |
| r13 = 7.513 | | | |
| | d13 = 1.067 | | |
| r14* = 77.556 | | | |
| | d14 = 1.500 | N8 = 1.5834 | ν8 = 30.23 |
| r15* = −28.791 | | | |
| | d15 = 1.100~1.150~1.695 | | |
| r16 = −13.077 | | | |
| | d16 = 1.000 | N9 = 1.84666 | ν9 = 23.82 |
| r17* = 59.445 | | | |
| | d17 = 1.105~5.106~10.030 | | |
| r18 = 14.286 | | | |
| | d18 = 1.800 | N10 = 1.7433 | ν10 = 49.22 |
| r19 = −39.143 | | | |
| | d19 = 0.700 | | |
| r20 = ∞ | | | |
| | d20 = 2.000 | N11 = 1.51680 | ν11 = 64.20 |
| r21 = ∞ | | | |

Aspherical Surface Data of Surface r3
$\epsilon = 1.0000$, $A4 = 0.11002 \times 10^{-2}$, $A6 = 0.49358 \times 10^{-4}$, $A8 = 0.12351 \times 10^{-5}$
Aspherical Surface Data of Surface r4
$\epsilon = 1.0000$, $A4 = 0.59048 \times ^{-3}$, $A6 = -0.54586 \times 10^{-4}$, $A8 = 0.96499 \times 10^{-6}$
Aspherical Surface Data of Surface r14
$\epsilon = 1.0000$, $A4 = 0.80102 \times 10^{-3}$, $A6 = 0.15056 \times 10^{-3}$, $A8 = -0.69790 \times 10^{-5}$
Aspherical Surface Data of Surface r15
$\epsilon = 1.0000$, $A4 = 0.32385 \times 10^{-2}$, $A6 = 0.22838 \times 10^{-3}$, $A8 = 0.35975 \times 10^{-5}$
Aspherical Surface Data of Surface r17
$\epsilon = 1.0000$, $A4 = -0.208 \times 10^{-3}$, $A6 = 0.20642 \times 10^{-5}$, $A8 = 0.16655 \times 10^{-6}$

TABLE 7

Construction Data of Example 7
f = 5.0~9.5~15.0, FNO = 2.76~2.90~2.94, 2ω = 70.2~39~25.1

| Radius of Curvature | Axial Distance | Refractive Index | Abbe Number |
|---|---|---|---|
| r1 = 10.526 | | | |
| | d1 = 1.200 | N1 = 1.8500 | ν1 = 40.04 |
| r2 = 4.966 | | | |
| | d2 = 3.289 | | |
| r3* = −15.064 | | | |
| | d3 = 0.800 | N2 = 1.5220 | ν2 = 52.20 |
| r4* = 20.985 | | | |
| | d4 = 0.800 | | |
| r5 = 16.377 | | | |
| | d5 = 1.500 | N3 = 1.84666 | ν3 = 23.82 |
| r6 = 1576.442 | | | |
| | d6 = 11.986~3.972~0.800 | | |

TABLE 7-continued

| | | | | | | | |
|---|---|---|---|---|---|---|---|
| r7 = | ∞ (ST) | | | | | | |
| | | d7 = | 0.600 | | | | |
| r8 = | 11.299 | | | | | | |
| | | d8 = | 2.254 | N4 = | 1.7545 | ν4 = | 51.57 |
| r9 = | −51.353 | | | | | | |
| | | d9 = | 0.100 | | | | |
| r10 = | 5.715 | | | | | | |
| | | d10 = | 3.000 | N5 = | 1.6510 | ν5 = | 55.78 |
| r11 = | −57.046 | | | | | | |
| | | d11 = | 0.010 | N6 = | 1.5140 | ν6 = | 42.83 |
| r12 = | −57.048 | | | | | | |
| | | d12 = | 0.700 | N7 = | 1.84666 | ν7 = | 23.82 |
| r13 = | 5.798 | | | | | | |
| | | d13 = | 1.217 | | | | |
| r14* = | −37.341 | | | | | | |
| | | d14 = | 1.500 | N8 = | 1.5834 | ν8 = | 30.23 |
| r15* = | −11.592 | | | | | | |
| | | d15 = 1.045~1.150~1.072 | | | | | |
| r16 = | −6.249 | | | | | | |
| | | d16 = | 1.000 | N9 = | 1.84666 | ν9 = | 23.82 |
| r17* = | −10.713 | | | | | | |
| | | d17 = 0.800~5.637~11.921 | | | | | |
| r18 = | 15.021 | | | | | | |
| | | d18 = | 1.800 | N10 = | 1.7433 | ν10 = | 49.22 |
| r19 = | −34.378 | | | | | | |
| | | d19 = | 0.700 | | | | |
| r20 = | ∞ | | | | | | |
| | | d20 = | 2.000 | N11 = | 1.51680 | ν11 = | 64.20 |
| r21 = | ∞ | | | | | | |

Aspherical Surface Data of Surface r3
$\epsilon = 1.0000$, $A4 = 0.13649 \times 10^{-2}$, $A6 = -0.78501 \times 10^{-4}$, $A8 = 0.21685 \times 10^{-5}$
Aspherical Surface Data of Surface r4
$\epsilon = 1.0000$, $A4 = 0.84258 \times 10^{-3}$, $A6 = -0.76339 \times 10^{-4}$, $A8 = 0.16125 \times 10^{-5}$
Aspherical Surface Data of Surface r14
$\epsilon = 1.0000$, $A4 = 0.82563 \times 10^{-3}$, $A6 = 0.25862 \times 10^{-3}$, $A8 = -0.11693 \times 10^{-4}$
Aspherical Surface Data of Surface r15
$\epsilon = 1.0000$, $A4 = 0.34902 \times 10^{-2}$, $A6 = 0.32802 \times 10^{-3}$, $A8 = 0.11504 \times 10^{-4}$
Aspherical Surface Data of Surface r17
$\epsilon = 1.0000$, $A4 = -0.61849 \times 10^{-3}$, $A6 = -0.23169 \times 10^{-4}$, $A8 = 0.52843 \times 10^{-6}$

TABLE 8

Actual Values of Conditional Formulae

| Ex. | (1) $|f1/fw|$ | (2) $(\tan\omega w)^2$ fw/TLw | (3) TLw Fnt/ (fw tanωw) | (4) f11/f1 | (5) Y = 0.7YMax ($|X| - |X0|$)/ $[C0(N' - N)f2]$ | (6) NL | (7) $|f1/f2|$ |
|---|---|---|---|---|---|---|---|
| 1 | 2.460 | 0.073 | 31.68 | 1.217 | −0.421 | 1.7545 | 1.100 |
| 2 | 2.442 | 0.073 | 30.59 | 1.258 | −0.246 | 1.7433 | 1.158 |
| 3 | 2.480 | 0.066 | 31.91 | 1.316 | −0.054 | 1.7545 | 1.241 |
| 4 | 2.426 | 0.066 | 32.05 | 0.934 | 0.018 | 1.7433 | 1.220 |
| 5 | 2.469 | 0.073 | 31.68 | 1.178 | — | 1.7433 | 1.228 |
| 6 | 2.469 | 0.071 | 32.13 | 1.168 | −0.192 | 1.7433 | 1.251 |
| 7 | 2.392 | 0.066 | 30.94 | 1.026 | −0.128 | 1.7433 | 1.388 |

What is claimed is:

1. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power and a second lens unit having a positive optical power, and the following conditional formulae are fulfilled:

$$2 < |f1/fw| < 4$$

$$0.058 < (\tan \omega w)^2 \times fw/TLw < 0.9$$

where f1 represents a focal length of the first lens unit;

fw represents a focal length of an entire optical system at a wide-angle end;

tan ωw represents a half view angle at a wide-angle end and

TLw represents a distance from a first vertex to an image plane at the wide-angle end.

2. An optical device as claimed in claim 1 further comprising a low-pass filter which adjusts spatial frequency characteristics of the optical image formed by the zoom lens system, said low-pass filter located between the first lens unit and the image sensor.

3. An optical device as claimed in claim 1 wherein the following conditional formula is fulfilled:

$$1 < |f1/f2| < 1.5$$

where f1 represents a focal length of the first lens unit; and f2 represents a focal length of the second lens unit.

4. An optical device as claimed in claim 1 wherein the lens unit closest to the image side has a positive optical power, said lens unit comprised of at least one positive lens element and the positive lens element closest to the image side fulfills the following conditional formula:

$$1.6<NL$$

where

NL represents a refractive index for a d-line of the positive lens element disposed closest to the image side within the lens unit, disposed closest to the image plane.

5. An optical device as claimed in claim 1 wherein the zoom lens system comprises a three-unit zoom lens, the zoom lens units having, from the object side thereof, a negative-positive-positive optical power configuration.

6. An optical device as claimed in claim 1 wherein the zoom lens system comprises a four-unit zoom lens, the zoom lens units having, from the object side thereof, a negative-positive-negative-positive optical power configuration.

7. An optical device as claimed in claim 1 wherein the first lens unit is comprised of three lens elements; from the object side thereof, a first lens element having a negative optical power, a second lens element having a negative optical power, and a third lens element having a positive optical power.

8. An optical device as claimed in claim 7 wherein the following conditional formula is fulfilled:

$$0.8<f11/f1<1.5$$

where f11 represents a focal length of a lens element disposed at the object-side end of the first lens unit; and f1 represents a focal length of the first lens unit.

9. An optical device as claimed in claim 1 wherein the second lens unit has an aspherical surface.

10. An optical device as claimed in claim 9 wherein the following conditional formulae are fullfilled:

$$-0.6<(|X|-|X0|)/[C0\cdot(N'-N)\cdot f2]<0$$

$$0.1Y\max \leq Y \leq 0.7Y\max$$

where

X represents a surface shape of an aspherical surface,

X0 represents a surface shape of a reference spherical surface of the aspherical surface;

C0 represents a curvature of the reference spherical surface of the aspherical surface;

N represents a refractive index for a d-line of the object-side medium of the aspherical surface;

N' represents a refractive index for the d-line of the image-side medium of the aspherical surface, f2 represents a focal length of the second lens unit;

Ymax represents a maximum effective optical path of an aspherical surface; and

Y represents a height in a direction perpendicular to an optical axis.

11. An optical device comprising:

a zoom lens system, comprising a plurality of lens units, which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a negative optical power and a second lens unit having a positive optical power, and the following conditional formulae are fulfilled:

$$2<|f1/fw|<4$$

f1 represents a focal length of the first lens unit;

fw represents a focal length of an entire optical system at a wide-angle end,

Fnt represents an f-number at a telephoto end;

tan ωw represents a half view angle at a wide-angle end; and

TLw represents a distance from a first vertex to an image plane at the wide-angle end.

12. An optical device as claimed in claim 11 further comprising a low-pass filter which adjusts spatial frequency characteristics of the optical image formed by the zoom lens system, said low-pass filter located between the first lens unit and the image sensor.

13. An optical device as claimed in claim 11 wherein the following conditional formula is fulfilled:

$$1<|f1/f2|<1.5$$

where f1 represents a focal length of the first lens unit; and f2 represents a focal length of the second lens unit.

14. An optical device as claimed in claim 11 wherein the lens unit closest to the image side has a positive optical power, said lens unit comprised of at least one positive lens element and the positive lens element closest to the image side fulfills the following conditional formula:

$$1.6<NL$$

where

NL represents a refractive index for a d-line of the positive lens element disposed closest to the image side within the lens unit disposed closest to the image plane.

15. An optical device as claimed in claim 11 wherein the zoom lens system comprises a three-unit zoom lens, the zoom lens units having, from the object side thereof, a negative-positive-positive optical power configuration.

16. An optical device as claimed in claim 11 wherein the zoom lens system comprises a four-unit zoom lens, the zoom lens units having, from the object side thereof, a negative-positive-negative-positive optical power configuration.

17. An optical device as claimed in claim 11 wherein the first lens unit is comprised of three lens elements, from the object side thereof, a first lens element having a negative optical power, a second lens element having a negative optical power, and a third lens element having a positive optical power.

18. An optical device as claimed in claim 17 wherein the following conditional formula is fulfilled:

$$0.8<f11/f1<1.5$$

where f11 represents a focal length of a lens element disposed at the object-side end of the first lens unit and f1 represents a focal length of the first lens unit.

19. An optical device as claimed in claim 11 wherein the second lens unit has an aspherical surface.

20. An optical device as claimed in claim 19 wherein the following conditional formula are fulfilled:

$$-0.6 < (|X|-|X0|)/[C0\cdot(N'-N)\cdot f2] \cdot 0$$

$$0.1 Y_{max} \leq Y \leq 0.7 Y_{max}$$

where

X represents a surface shape of an aspherical surface;

X0 represents a surface shape of a reference spherical surface of the aspherical surface;

C0 represents a curvature of the reference spherical surface of the aspherical surface;

N represents a refractive index for a d-line of the object-side medium of the aspherical surface;

N' represents a refractive index for the d-line of the image-side medium of the aspherical surface;

f2 represents a focal length of the second lens unit;

Ymax represents a maximum effective optical path of an aspherical surface; and

Y represents a height in a direction perpendicular to an optical axis.

21. A digital camera comprising:

an optical lens device, and a memory;

wherein said optical lens device comprises a zoom lens system, and an image sensor;

wherein said zoom lens system includes a plurality of lens units which achieve zooming by varying unit-to-unit distances; and said image sensor converts an optical image formed by said zoom lens system into an electrical signal;

wherein the zoom lens system comprises at least, from an object side thereof to an image side thereof, a first lens unit having a negative optical power and a second lens unit having a positive optical power, and the following conditional formulae are fulfilled:

$$2 < |f1/fw| < 4$$

$$0.058 < (\tan \omega w)^2 \times fw/TLw < 0.9$$

where f1 represents a focal length of the first lens unit;

fw represents a focal length of an entire optical system at a wide-angle end;

tan ωw represents a half view angle at a wide-angle end; and

TLw represents a distance from a first vertex to an image plane at the wide angle end; and wherein said memory is adapted for storing image data from said image sensor, and said memory is not removable from said digital camera.

22. A digital camera as claimed in claim 21 wherein said optical lens device further comprises a low-pass filter which adjusts spatial frequency characteristics of the optical image formed by the zoom lens system, said low-pass filter located between the first lens unit and the image sensor.

23. A digital camera comprising:

an optical lens device, and a memory;

wherein said optical lens device comprises a zoom lens system, and an image sensor;

wherein said zoom lens system includes a plurality of lens units which achieve zooming by varying unit-to-unit distances; and said image sensor converts an optical image formed by said zoom lens system into an electrical signal, wherein the zoom lens system comprises at least, from an object side thereof to an image side thereof, a first lens unit having a negative optical-power and a second lens unit having a positive optical power, and the following conditional formulae are fulfilled:

$$2 < |f1/fw| < 4$$

$$10 < TLw \times Fnt/(fw \times \tan \omega w) < 40$$

where f1 represents a focal length of the first lens unit, fw represents a focal length of an entire optical system at a wide-angle end;

Fnt represents an f-number at a telephoto end, tan ωw represents a half view angle at a wide-angle end; and TLw represents a distance from a first vertex to an image plane at the wide-angle end, and wherein said memory is adapted for storing image data from said image sensor; and said memory is not removable from said digital camera.

24. A digital camera as claimed in claim 23 wherein said optical lens device further comprises a low-pass filter which adjusts spatial frequency characteristics of the, optical image formed by the zoom lens system, said low-pass filter located between the first lens unit and the image sensor.

* * * * *

UNITED STATES PATENT AND TRADEMARK OFFICE
CERTIFICATE OF CORRECTION

PATENT NO.    : 6,452,729 B2  
DATED         : September 17, 2002  
INVENTOR(S)   : Yasushi Yamamoto Page 1 of 3

It is certified that error appears in the above-identified patent and that said Letters Patent is hereby corrected as shown below:

Column 2,  
Line 1, after "despite", delete ".".

Column 6,  
Line 38, after "thereof", insert -- . --.

Column 10,  
Line 3, of TABLE 1, delete "f=4.45-7.8-12.7, FNO=2.58-2.79-2.87, 2ω=76.8-45.9-28.5", and insert -- f=4.45~7.8~12.7, FNO=2.58~2.79~2.87, 2ω=76.8~45.9~28.5 --.  
Line 50, of TABLE 1, under the heading "Aspherical Surface Data of Surface r16", delete "ε=1.0000, A4= $-0.55664\times10^{-3}$, A6= $0.19026\times10^{-4}$, A8= $0.1674\times10^{-5}$", and insert -- ε = 1.0000, A4 = $-0.55664\times10^{-3}$, A6 = $-0.19026\times10^{-4}$, A8 = $0.16174\times10^{-5}$ --.  
Line 52, of TABLE 1, under the heading "Aspherical Surface Data of Surface r17", delete "ε=1.0000, A4 = $-0.15165\times10^{-4}$, A6 = $-0.23729\times10^{-4}$, A8= $0.12818\times10^{-5}$", and insert -- ε = 1.0000, A4 = $-0.20810\times10^{-3}$, A6 = $0.20642\times10^{-5}$, A8 = $0.16655\times10^{-6}$ --.

Column 11,  
Line 50, of TABLE 2, under the heading "Aspherical Surface Data of Surface r3", delete "ε = 1.0000, A4 = $0.30044\times10^{-3}$, A6 = $0.16934\times10^{-4}$, A8= $0.30140\times10^{-6}$", and insert -- ε = 1.0000, A4 = $0.30044\times10^{-3}$, A6 = $-0.16934\times10^{-4}$, A8 = $0.30140\times10^{-6}$ --.

Column 15,  
Line 22, of TABLE 5, after "N4=", delete "1.7433", and insert -- 1.74330 --.  
Line 34, of TABLE 5, after "N7=", delete "1.7859", and insert -- 1.78590 --.  
Line 40, of TABLE 5, after "N9=", delete "1.7433" and insert -- 1.74330 --.  
Line 44, of TABLE 5, after "d20=", delete "2000" and insert -- 2.000 --.  
Line 54, of TABLE 5, under the heading "Aspherical Surface Data of Surface r4" delete "ε =1.0000, A4 = $0.36810\times10^{-3}$, A6 = $-0.27602\times10^{-4}$, A8 = $0.84054\times10^{-7}$", and insert -- ε =1.0000, A4 = $0.36810\times10^{-3}$, A6 = $-0.27602\times10^{-4}$, A8 = $0.83054\times10^{-7}$ --.

Column 17,  
Line 13, of TABLE 6, after "N2=", delete "1.5220", and insert -- 1.52200 --.  
Line 23, of TABLE 6, after "N4=", delete "1.7545", and insert -- 1.75450 --.  
Line 27, of TABLE 6, after "N5=", delete "1.6510", and insert -- 1.65100 --.  
Line 29, of TABLE 6, after "N6=", delete "1.5140", and insert -- 1.51400 --.  
Line 35, of TABLE 6, after "N8=", delete "1.5834", and insert -- 1.58340 --.  
Line 40, of TABLE 6, after "r17*=", delete "59.445", and insert -- −59.445 --.

UNITED STATES PATENT AND TRADEMARK OFFICE
CERTIFICATE OF CORRECTION

PATENT NO.    : 6,452,729 B2
DATED         : September 17, 2002
INVENTOR(S)   : Yasushi Yamamoto It is certified that error appears in the above-identified patent and that said Letters Patent is hereby corrected as shown below:

Column 17 cont'd,
Line 51, of TABLE 6, under the heading "Aspherical Surface Data of Surface r3", delete "$\varepsilon = 1.0000$, $A4 = 0.11002 \times 10^{-2}$, $A6 = 0.49358 \times 10^{-4}$, $A8 = 0.12351 \times 10^{-5}$", and insert -- $\varepsilon = 1.0000$, $A4 = 0.11002 \times 10^{-2}$, $A6 = -0.49358 \times 10^{-4}$, $A8 = 0.12351 \times 10^{-5}$ --.
Line 59, of TABLE 6, under the heading "Aspherical Surface Data of Surface r17", delete "$\varepsilon = 1.0000$, $A4 = -0.208 \times 10^{-3}$, $A6 = 0.20642 \times 10^{-5}$, $A8 = 0.16655 \times 10^{-6}$", and insert -- $\varepsilon = 1.0000$, $A4 = 0.20810 \times 10^{-3}$, $A6 = 0.20642 \times 10^{-5}$, $A8 = 0.16655 \times 10^{-6}$ --.
Line 9, of TABLE 7, after "N1=", delete "1.8500", and insert -- 1.85000 --.
Line 13, of TABLE 7, after "N2=", delete, "1.5220", and insert -- 1.52200 --.

Column 19,
Line 6, (line 25 of the continuation of TABLE 7), after "N4=", delete "1.7545", and insert -- 1.75450 --.
Line 10, (line 29 of the continuation of TABLE 7), after "N5=", delete "1.6510", and insert -- 1.65100 --.
Line 12, (line 31 of the continuation of TABLE 7), after "N6=", delete "1.5140", and insert -- 1.51400 --.
Line 17, (line 37 of the continuation of TABLE 7), after "N8=", delete "1.5834", and insert -- 1.58340 --.
Line 25, (line 45 of the continuation of TABLE 7), after "N10=", delete "1.7433", and insert -- 1.74330 --.

Column 20,
Line 57, after "end", insert -- ; --.

Column 21,
Line 15, after "unit", delete ",".
Line 48, after "surface", delete ",", and insert -- ; --.
Line 56, after "surface", delete ",", and insert -- ; --.

Column 22,
Line 9, after "2 < | fl / fw | < 4", insert -- $10 < TLw \times Fnt / (fw \times \tan \omega w) < 40$ --.
Line 12, after "end", delete ",", and insert -- ; --.
Line 52, after "elements", delete ",", and insert -- ; --.
Line 64, after "unit", insert -- ; --.

UNITED STATES PATENT AND TRADEMARK OFFICE
CERTIFICATE OF CORRECTION

PATENT NO. : 6,452,729 B2
DATED : September 17, 2002
INVENTOR(S) : Yasushi Yamamoto It is certified that error appears in the above-identified patent and that said Letters Patent is hereby corrected as shown below:

Column 23,
Line 2, delete "formula" and insert -- formulae --.
Line 4, delete "-0.6< ( ×│-│X0 │)/[C0•(N'–N) • f2]0", and insert
-- 0.6< ( ×│-│x0 │)/[C0•(N'–N) • f2] < 0 --.

Column 24,
Line 20, after "signal", delete ",", and insert -- ; --.
Line 23, delete "optical-power" and insert -- optical power --.
Line 31, after "unit" delete "," and insert -- ; -- .
Line 34, after "end", delete ",", and insert -- ; -- .
Line 38, after "end", delete ",", and insert -- ; --.
Line 44, after "the", delete ",".

Signed and Sealed this

Twenty-third Day of March, 2004

JON W. DUDAS
*Acting Director of the United States Patent and Trademark Office*